(12) United States Patent
Parron et al.

(10) Patent No.: US 9,426,724 B2
(45) Date of Patent: Aug. 23, 2016

(54) APPARATUS, SYSTEM AND METHOD OF CONTROLLING WIRELESS SCANNING

(71) Applicant: Intel Corporation, Santa Clara, CA (US)

(72) Inventors: Jerome Parron, Fuerth (DE); Sudhir Appaji, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/468,563

(22) Filed: Aug. 26, 2014

(65) Prior Publication Data
US 2016/0066252 A1    Mar. 3, 2016

(51) Int. Cl.
*H04W 48/16* (2009.01)
*H04W 48/20* (2009.01)

(52) U.S. Cl.
CPC .............. *H04W 48/16* (2013.01); *H04W 48/20* (2013.01)

(58) Field of Classification Search
CPC .............................. H04W 48/16; H04W 48/20
USPC .................. 455/161.1, 432.1–434, 450–452.2
See application file for complete search history.

(56) References Cited

U.S. PATENT DOCUMENTS

| | | | | |
|---|---|---|---|---|
| 8,339,990 B1* | 12/2012 | Tzamaloukas | ........ | H04W 48/18 370/254 |
| 9,088,925 B1* | 7/2015 | Chen | | |
| 2007/0184835 A1* | 8/2007 | Bitran et al. | .................. | 455/434 |
| 2007/0254632 A1* | 11/2007 | Beadle et al. | ................. | 455/411 |
| 2010/0265885 A1* | 10/2010 | Umeuchi | .............. | H04W 48/16 370/328 |
| 2012/0133555 A1* | 5/2012 | Hyun | .................... | G01S 5/0236 342/357.31 |
| 2012/0258715 A1* | 10/2012 | Souissi et al. | ................. | 455/436 |
| 2013/0084856 A1* | 4/2013 | Prasad | ............. | H04W 36/0088 455/434 |
| 2015/0245280 A1* | 8/2015 | Zhou | ..................... | H04W 36/32 455/434 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
Wi-Fi Alliance Technical Committee P2P Task Group, Wi-Fi Peer-to-Peer (P2P) Technical Specification, Version 1.2, Dec. 14, 2011, 160 pages.
OMA-AD-SUPL-V2_0-20120417-A. Open Mobile Alliance, Secure User Plane Location Architecture, Approved Version 2.0, Apr. 17, 2012, 51 pages.
W3C, Geolocation API Specification, W3C Proposed Recommendation May 10, 2012, 18 pages.

* cited by examiner

*Primary Examiner* — Michael Mapa
(74) *Attorney, Agent, or Firm* — Shichrur & Co.

(57) ABSTRACT

Some demonstrative embodiments include apparatuses, systems and/or methods of controlling wireless scanning. For example, an apparatus may include a radio to communicate with a wireless network; and a scan controller to control a wireless scan by the radio according to a scan pattern, the scan controller to determine a mobility state of the mobile device, the mobility state representing a combination of a velocity of the mobile device and an environment of the mobile device, and to determine the scan pattern based on the mobility state.

23 Claims, 10 Drawing Sheets

APPARATUS, SYSTEM AND METHOD OF CONTROLLING WIRELESS SCANNING

TECHNICAL FIELD

Embodiments described herein generally relate to controlling wireless scanning.

BACKGROUND

A mobile device may perform a scan of a wireless network, e.g., in order to detect available Wireless Fidelity (Wi-Fi) networks in a vicinity of the mobile device.

Regular scanning for available Wi-Fi networks in the vicinity of the mobile device may result in draining a battery of the mobile device.

There is a need to reduce a number and/or a frequency of Wi-Fi scans, e.g., in order to preserve a life of the battery, and/or decrease a power consumption of the mobile device.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
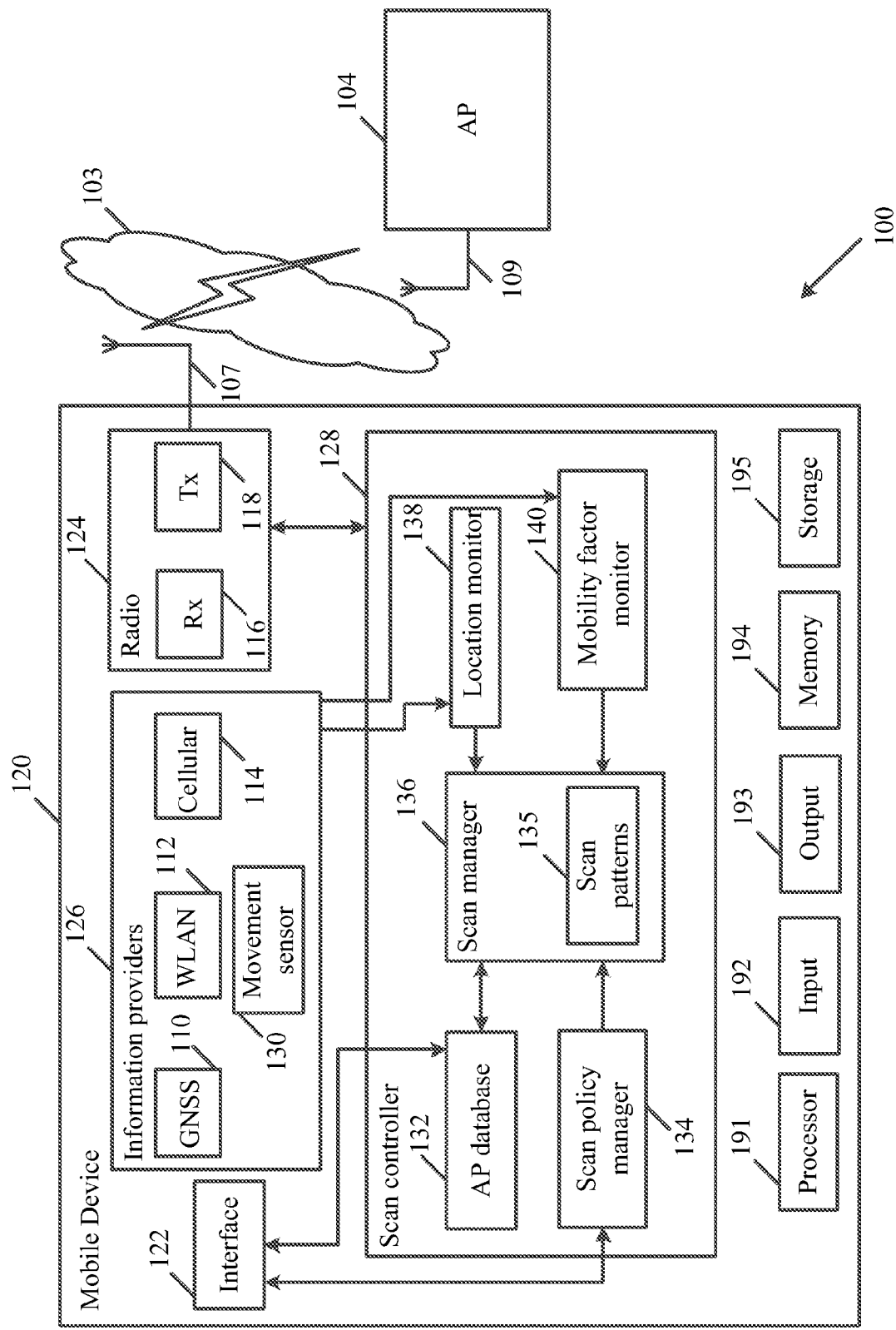
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a User Equipment (UE), a wireless station (STA), a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 (IEEE Standard for Information Technology—Telecommunications and information exchange between systems Local and metropolitan area networks—Specific requirements Part 11: Wireless LAN Medium Access Control (MAC) and Physical Layer (PHY) Specifications—Amendment 4: Enhancements for Very High Throughput for Operation in Bands below 6 GHz); IEEE 802.11ad (IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 December, 2012)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Open Mobile Alliance (OMA) standards, including the Secure User Plane Location (SUPL) protocol (SUPL-OMA-AD-SUPL-V2.0) and/or future versions and/or derivatives thereof, devices and/or networks operating in accordance with existing World-Wide-Web Consortium (W3C) standards, including the W3C Hypertext Markup Language (HTML) Version 5, October 2010 and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

Reference is now made to FIG. 1, which schematically illustrates a block diagram of a system 100, in accordance with some demonstrative embodiments.

As shown in FIG. 1, in some demonstrative embodiments, system 100 may include one or more mobile devices, e.g., a mobile device 120, capable of communicating with one or more access points (APs), e.g., an access point 104.

In some demonstrative embodiments, mobile device 120 may include, for example, a User Equipment (UE), a mobile computer, a laptop computer, a notebook computer, a tablet computer, an Ultrabook™ computer, an Internet of Things (IoT) device, a mobile internet device, a handheld computer, a handheld device, a storage device, a PDA device, a handheld PDA device, an on-board device, an off-board device, a hybrid device, a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), an "Origami" device or computing device, a video device, an audio device, an A/V device, a gaming device, a media player, a Smartphone, or the like.

In some demonstrative embodiments, mobile device 120 may include, for example, a processor 191, an input unit 192, an output unit 193, a memory unit 194, and/or a storage unit 195. Mobile device 120 may optionally include other suitable hardware components and/or software components. In some demonstrative embodiments, some or all of the components of mobile device 120 may be enclosed in a common housing or packaging, and may be interconnected or operably associated using one or more wired or wireless links. In other embodiments, components of mobile device 120 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of mobile device 120 and/or of one or more suitable applications.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by mobile device 120.

Input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Light Emitting Diode (LED) display unit, a Liquid Crystal Display (LCD) display unit, a plasma display unit, Cathode Ray Tube (CRT) display unit, one or more audio speakers or earphones, or other suitable output devices.

In some demonstrative embodiments, mobile device 120 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (Wi-Fi) channel, an IR channel, a Bluetooth (BT) channel, and the like.

In some demonstrative embodiments, mobile device 120 may include at least one radio 124 to perform wireless communication between mobile device 120 and one or more other wireless communication devices, e.g., AP 104.

In some demonstrative embodiments, radio 124 may include one or more wireless receivers (Rx) 116, able to receive wireless communication signals, RF signals, frames, blocks, transmission streams, packets, messages, data items, and/or data.

In some demonstrative embodiments, radio 124 may include one or more wireless transmitters (Tx) 118, able to send wireless communication signals, RF signals, frames, blocks, transmission streams, packets, messages, data items, and/or data.

In some demonstrative embodiments, radio 124 may include modulation elements, demodulation elements, amplifiers, analog to digital and digital to analog converters, filters, and/or the like. For example, radio 124 may include or may be implemented as part of a wireless Network Interface Card (NIC), and the like.

In some demonstrative embodiments, radio 124 may include, or may be associated with one or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication, e.g., using beam-forming techniques. For example, antennas 107 may include a phased array antenna, a multiple element antenna, a set of switched beam antennas, and/or the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, mobile device 120 may be configured to connect to a wireless network, e.g., a Wi-Fi network, via an access point, e.g., AP 104.

In some demonstrative embodiments, mobile device 120, and/or AP 104 may be configured to communicate, for example, over a plurality of wireless communication bands. For example, mobile device 120, and/or AP 104 may be configured to communicate over one or more Wireless Local Area Network (WLAN) frequency bands, e.g., Wi-Fi frequency bands, and/or cellular bands.

In some demonstrative embodiments, the plurality of wireless communication bands may include wireless communication bands of one or more Radio Access Technologies (RATs), for example, one or more of a WLAN technology, a cellular technology, and the like.

In one example, mobile device 120 may connect to the Wi-Fi network to offload cellular traffic to the Wi-Fi network, e.g., to reduce load in a cellular network.

In some demonstrative embodiments, mobile device 120 may be configured to perform wireless scanning before establishing a wireless connection between mobile device 120 and the Wi-Fi network.

In some demonstrative embodiments, mobile device 120 may perform the wireless scanning in order to detect available access points in a vicinity of mobile device 120. For example, mobile device 120 may perform the wireless scanning to detect AP 104, for example, if AP 104 is in the vicinity of mobile device 120.

In some demonstrative embodiments, the continued wireless scanning for available access points in the vicinity of mobile device 120 may result in increased power consumption of mobile device 120, and/or draining a battery of mobile device 120.

For example, wireless scanning performed during high-speed motion in order to detect WLAN networks, e.g., in a train and/or a plane, may drain the battery of mobile device 120, for example, if no WLAN access points are introduced in transports such as trains and/or planes.

In some demonstrative embodiments, infrequent wireless scanning may preserve a life of the battery of mobile device 120. However, the infrequent wireless scanning may lead to not detecting one or more WLAN access points.

In some demonstrative embodiments, mobile device 120 may include a scan controller 128 configured to control the wireless scanning, e.g., as described below.

In some demonstrative embodiments, controller 128 may include circuitry configured to perform the functionality of controller 128. Additionally or alternatively, one or more functionalities of controller 128 may be implemented by logic, which may be executed by a machine and/or one or more processors, e.g., as described below.

In some demonstrative embodiments, scan controller 128 may be configured to perform a smart wireless scanning in order to preserve the life of the battery of mobile device 120, and/or to reduce the power consumption of mobile device 120, e.g., without missing the detection of available access points, e.g., as described below.

In some demonstrative embodiments, scan controller 128 may be configured to control the wireless scanning based on one or more parameters, e.g., from cellular systems, WLAN systems, sensors and/or other sources, for example, in order to reduce a number and/or a frequency of wireless scans, e.g., as described below.

In some demonstrative embodiments, scan controller 128 may be configured to control the wireless scanning based on a combination of mobility indicators and/or one or more other indicators, for example, a location indicator, Wi-Fi profile characteristics, and the like, e.g., as described below.

In some demonstrative embodiments, scan controller 128 may control the wireless scanning by radio 124 according to a scan pattern 135, e.g., as described below.

In some demonstrative embodiments, scan controller 128 may determine scan pattern 135 to reduce the number and/or the frequency of the wireless scanning.

For example, scan pattern 135 may be configured to reduce the number and/or the frequency of the wireless scanning, e.g., in order to reduce the power consumption of mobile device 120, and/or to preserve the life of the battery of mobile device 120.

In some demonstrative embodiments, scan pattern 135 may define one or more wireless scanning parameters.

For example, scan pattern 135 may define a duration of the wireless scanning, periodicity of the wireless scanning, an identifier, e.g., a Service Set Identifier (SSID) of an access point to be searched, a type of the wireless scanning, and/or the like.

For example, scan pattern 135 may include an active scan and/or a passive scan for APs.

In some demonstrative embodiments, scan controller 128 may determine scan pattern 135 based on a mobility state of mobile device 120.

In some demonstrative embodiments, the mobility state of mobile device 120 may represent a combination of a velocity of mobile device 120 and an environment of mobile device 120, e.g., as described below.

In some demonstrative embodiments, scan controller 128 may select the mobility state of mobile device 120 from a plurality of predefined mobility states.

In some demonstrative embodiments, the plurality of mobility states may correspond to a plurality of predefined environment types.

In some demonstrative embodiments, scan controller 128 may select the mobility state of mobile device 120 according to an environment type corresponding to the environment of mobile device 120.

In some demonstrative embodiments, the plurality of environment types may include, for example, a home environment, a work environment, a mall environment, a street environment, a building environment, a vehicle environment, and/or any other environment type.

In some demonstrative embodiments, the plurality of mobility states may correspond to a plurality of predefined movement states.

For example, the plurality of movement states may include a pedestrian state, a train state, an airplane state, and/or the like.

In some demonstrative embodiments, scan controller 128 may determine scan pattern 135 based on one or more inputs from one or more information providers 126, e.g., as described below.

In some demonstrative embodiments, information providers 126 may provide information corresponding to a location of mobile device 120.

For example, information providers 126 may provide cellular information corresponding to the cellular network, WLAN information corresponding to the WLAN, information from one or more location modules, and/or the like, e.g., as described below.

In some demonstrative embodiments, information providers 126 may be configured to receive information from one or more location sources over WM 103.

For example, the location sources may include GNSS satellites, access points, RF transmitters, cellular base stations, and/or the like.

In some demonstrative embodiments, information providers 126 may include a GNSS receiver 110 configured to receive location and time information from GNSS satellites. For example, GNSS receiver 110 may receive location and time messages from a plurality of GNSS satellites.

In some demonstrative embodiments, GNSS receiver 110 may determine the location of mobile device 120 based on the location and time messages from the GNSS satellites.

In some demonstrative embodiments, information providers 126 may include a WLAN location provider 112 configured to receive information from APs, RF transmitters, and the like. For example, WLAN location provider 112 may receive a SSID from AP 104, signal strength information from AP 104, e.g., a received signal strength indication (RSSI), and/or the like.

In some demonstrative embodiments, radio 124 may perform the functionality of WLAN location provider 112.

In some demonstrative embodiments, information providers 126 may include a cellular information provider 114, e.g., a cellular radio, configured to receive information from cellular base stations. For example, cellular information provider 114 may receive information related to a current cellular service cell, a list of visible neighbor cellular service cells, and/or the like.

For example, the information related to the cellular service cell may include a cell identity, or a potential cell identity, a location or tracking area identity, a signal strength, and/or the like.

In some demonstrative embodiments, information providers 126 may include a movement sensor 130 configured to track one or more changes in a velocity and/or an acceleration of mobile device 120.

For example, movement sensor 130 may track one or more changes in the velocity and/or the acceleration of mobile device 120 based on accelerometer measurements, gyroscope measurements, and/or the like.

In some demonstrative embodiments, movement sensor 130 may include an accelerometer, a gyroscope, and/or the like, e.g., to track one or more changes in the velocity and/or the acceleration of mobile device 120.

In some demonstrative embodiments, scan controller 128 may include a location monitor 138 configured to monitor the location of mobile device 120.

In some demonstrative embodiments, location monitor 138 may determine a current location of mobile device 120 based on information received from information providers 126.

For example, location monitor 138 may receive from information providers 126 information related to a Public Land Mobile Network (PLMN), a routing area, a cell identifier from cellular information provider 114, the SSID of AP 104 from WLAN location provider 112, coordinates of mobile device 120 from GNSS receiver 110, and/or the like.

In some demonstrative embodiments, scan controller 128 may include a mobility factor monitor 140 configured to determine a movement state of mobile device 120, e.g., based on information provided by information providers 126.

In some demonstrative embodiments, mobility factor monitor 140 may estimate the instantaneous and/or the average velocity of mobile device 120, e.g., based on information provided by GNSS receiver 110. For example, mobility factor monitor 140 may determine the instantaneous and/or the average velocity of mobile device 120 based on a change of the coordinates of mobile device 120 within a predefined period of time.

In some demonstrative embodiments, mobility factor monitor 140 may estimate the movement state of mobile device 120 based on information provided by cellular information provider 114. For example, mobility factor monitor 140 may estimate the movement state of mobile device 120 based on a change of a power level of the cellular serving cell, and/or based on a number of a changed cellular serving cells within the predefined period of time.

In some demonstrative embodiments, mobility factor monitor 140 may determine the movement state of mobile device 120, e.g., based on the velocity of mobile device 120.

In some demonstrative embodiments, mobility factor monitor 140 may determine the movement state of mobile device 120, e.g., based on information provided by movement sensor 130. For example, mobility factor monitor 140 may determine the movement state of mobile device 120 based on information related to the acceleration of mobile device 120, and/or to a change in the velocity of mobile device 120.

In some demonstrative embodiments, scan controller 128 may determine the mobility state of mobile device 120 based on cellular information corresponding to a cellular network, WLAN information corresponding to a WLAN, information from one or more location modules, and movement information from one or more movement sensors received from information providers 126, e.g., as described below.

For example, scan controller 128 may determine the mobility state of mobile device 120 based on cellular information corresponding to the cellular network. For example, cellular information may include variation of power levels of a cellular serving cell and/or a neighbor cellular serving cell, variation of visible neighbor cellular serving cells, frequency of cellular serving cell change rate, frequency of RAT change, and/or the like.

In some demonstrative embodiments, the plurality of predefined mobility states may include one or more vehicle states corresponding to one or more types of vehicles.

In some demonstrative embodiments, the plurality of mobility states may include at least a car state, a train state, an airplane state, and/or any other vehicle type.

In some demonstrative embodiments, scan controller 128 may select the vehicle state of mobile device 120 based on the velocity and/or the velocity changes of mobile device 120.

In one example, scan controller 128 may select the vehicle state of mobile device 120, e.g., based on a maximum velocity reached by mobile device 120. For example, a velocity of mobile device 120 below 100 kilometers per hour (kmh) may indicate the car state, a velocity of mobile device 120 between 100 kmh and 300 kmh may indicate the train state, and/or the velocity of mobile device 120 above 300 kmh may indicate the airplane state.

In another example, scan controller 128 may select the vehicle state of mobile device 120 based on changes in the velocity of mobile device 120. For example, relatively small variations in the velocity of mobile device 120 may indicate the train state, or the airplane state, and relatively large variations in the velocity of mobile device 120 may indicate the car state.

In some demonstrative embodiments, scan controller 128 may select the mobility state of mobile device 120 according to the movement state.

In some demonstrative embodiments, the plurality of movement states may include a static state and at least one non-static state.

In one example, scan controller 128 may determine a static movement state of mobile device 120, for example, if the velocity of mobile device 120 is close to null, no change in a position of mobile device 120 is detected, a cellular serving cell of mobile device 120 remains constant, only a low variation of the cellular serving cell power level is detected, and/or no change in visible cellular serving neighbor cells is detected.

In another example, scan controller 128 may determine a pedestrian movement state of mobile device 120, for example, if the instantaneous and average velocity of mobile device 120 is below a predefined threshold, e.g., 5 kmh, a relatively low cellular serving cell reselection rate is detected, a medium cellular serving cell power level change rate, and/or a relatively low change of visible cellular serving neighbor cells is detected.

In another example, scan controller 128 may determine a vehicle movement state of mobile device 120, for example, if the instantaneous and average velocity of mobile device 120 is above the predefined threshold, e.g., 20 kmh for the instantaneous velocity, a relatively high cellular serving cell reselection rate is detected, a relatively high change in cellular service cell power level is detected, and/or a relatively high change of visible cellular serving neighbor cells is detected.

In some demonstrative embodiments, scan controller 128 may determine the mobility state of mobile device 120 based on one or more configurations and/or settings of mobile device 120.

In some demonstrative embodiments, scan controller 128 may determine the mobility state of mobile device 120 based on an airplane mode setting of mobile device 120, information received from information providers 126, Wi-Fi profile characteristics, and the like.

For example, scan controller 128 may determine the airplane mobility state of mobile device 120, for example, if the airplane mode configuration of mobile device 120 is on.

In some demonstrative embodiments, scan controller 128 may determine a movement ("relative mobility") of mobile device 120 relative to AP 104.

For example, scan controller 128 may determine that mobile device 120 moves closer to AP 104, mobile device 120 moves away from AP 104, or mobile device 120 is static relative to AP 104.

In some demonstrative embodiments, scan controller 128 may determine the movement of mobile device 120 relative to AP 104 based on a change in a power level of signals from AP 104.

In one example, scan controller 128 may detect an increase in the power level of the signals from AP 104, for example, if mobile device 120 moves closer to AP 104.

In another example, scan controller 128 may detect a decrease in the power level of the signals from AP 104, for example, if mobile device 120 moves away from AP 104.

In some demonstrative embodiments, scan controller 128 may determine the movement of mobile device 120 relative to AP 104 based on a change in a difference between a location of mobile device 120 and a location of AP 104.

For example, scan controller 128 may determine whether mobile device 120 is moving closer to AP 104, moving away from AP 104, or stays within the same distance from AP 104, for example, based on a difference between a coordinate of AP 104 and a coordinate of mobile device 120.

In some demonstrative embodiments, scan controller 128 may be configured to perform the wireless scanning based on an identity and/or the location of AP 104.

In some demonstrative embodiments, scan controller 128 may be configured to associate the mobility state of mobile device 120 with the identity and/or the location of AP 104.

In some demonstrative embodiments, scan controller 128 may perform the wireless scanning based on a mobility tag of AP 104, e.g., as described below.

In some demonstrative embodiments, the mobility tag of an AP may characterize a Wi-Fi profile of the AP. For example, the mobility tag of the AP may indicate an environment of the AP, e.g., an environment of AP 104.

For example, the mobility tag may include a "Static—Home" tag, a "Mobility—Public transport train" tag, a "Mobility—Pedestrian—Mall" tag, and/or any other tag.

In some demonstrative embodiments, scan controller 128 may configure the mobility tag of AP 104 based on the mobility state of mobile device 120.

For example, scan controller 128 may detect AP 104, and may tag AP 104 as "Mobility—Public transport plane", for example, if scan controller 128 detects the airplane mobility state of mobile device 120.

In some demonstrative embodiments, scan controller 128 may search for APs with a specific mobility tag, for example, only if the mobility state of mobile device 120 corresponding to the specific mobility tag is detected.

For example, scan controller 128 may search for AP 104 with the tag "Mobility—Public transport plane", for example, only if mobile device 120 is at the plane mobility state.

In some demonstrative embodiments, AP 104 may broadcast the mobility tag, e.g., which may be assigned to AP 104 by a network operator.

For example, AP 104 may broadcast the "Public transport plane" tag, for example, if an airline company assigns to AP 104 "Public transport plane" tag.

In some demonstrative embodiments, AP 104 may periodically broadcast the mobility tag. For example, AP 104 may broadcast the mobility tag as a part of a beacon frame.

In some demonstrative embodiments, AP 104 may transmit the mobility tag to mobile device 120. For example, AP 104 may transmit the mobility tag to mobile device 120 as a probe response to a probe request sent by mobile device 120.

In some demonstrative embodiments, the mobility tag of AP 104 may be configured by an external factor, e.g., as described below.

In some demonstrative embodiments, the mobility tag of AP 104 may be configured manually, e.g., by a user of mobile device 120, configured at production, and/or configured over the air, e.g., via a device management procedure.

In one example, the network operator may update an Access Network Discovery and Selection Function (ANDSF) policy to provide the SSID of AP 104 along with the mobility tag of AP 104.

For example, scan controller 128 may assign the "Mobility—Public transport plane" tag to AP 104 detected in the airplane, for example, based on the SSID provided by the airline company.

In another example, the user of mobile device 120 may configure the mobility tag of the AP via an interface 122, for example, if the mobility tag of the AP is configured manually.

In some demonstrative embodiments, mobile device 120 may include interface 122 configured to interface between mobile device 120 and the user of mobile device 120.

In some demonstrative embodiments, interface 122 may include a Graphical User Interface (GUI). In other demonstrative embodiments, interface 122 may be implemented as part of input unit 192.

For example, the user of mobile device 120 may assign the "Mobility—Public transport plane" tag to AP 104 by entering a number of an airplane ticket via interface 122, for example, if the number of the airplane ticket corresponds to the SSID of AP 104, provided by the airline company.

In some demonstrative embodiments, scan controller 128 may automatically configure the mobility tag of AP 104.

For example, scan controller 128 may automatically configure the mobility tag of AP 104, e.g., based on the mobility state of mobile device 120 determined at time of a previous detection of AP 104 and/or connection to AP 104 by mobile device 120.

For example, scan controller 128 may detect AP 104 when mobile device 120 is at the "Pedestrian—Mall" mobility state. According to this example, scan controller 128 may assign to AP 104 a "Mobility—Pedestrian—Mall" tag.

In some demonstrative embodiments, scan controller 128 may optimize a search of available APs, e.g., as described below.

In some demonstrative embodiments, scan controller 128 may optimize the search of available APs by increasing a frequency of the wireless scanning in a known location, and/or by not using hidden SSID search of APs in the environment unfitted to the mobility state of mobile device 120.

In some demonstrative embodiments, scan controller 128 may include an AP database 132 configured to store information related to known APs.

In some demonstrative embodiments, scan controller 128 may optimize the search of available APs based on the information stored in AP database 132.

For example, AP database 132 may store the SSID of AP 104, the coordinates of mobile device 120 in time of connection to AP 104, the mobility tag assigned to AP 104, and/or any other information related to AP 104.

In some demonstrative embodiments, scan controller 128 may use AP database 132 to search for the APs corresponding to the mobility state of mobile device 120.

For example, scan controller 128 may search for APs stored in AP database 132 under a "Static—home" classification, for example, if scan controller 128 detects the "Static—home" mobility state of mobile device 120.

In some demonstrative embodiments, scan controller 128 may update AP database 132, for example, if scan controller 128 detects a new AP.

For example, scan controller 128 may store a location of AP 104 in AP database 132, and scan controller 128 may set a "Mobility—Mall" tag to AP 104, for example, if AP 104 was detected in an environment corresponding to the mall mobility state of mobile device 120.

In some demonstrative embodiments, scan controller 128 may enable or disable the wireless scanning based on at least one scan policy corresponding to the mobility state of mobile device 120.

In some demonstrative embodiments, scan controller 128 may include a scan policy manager 134 configured to determine and/or to store one or more scan policies.

For example, scan policy manager 134 may define the scan policy as "always scan if Wi-Fi enabled", "scan only in static condition", "scan only in static condition at home", "scan only in static and pedestrian condition at home and at work", "scan in static and mobility condition (train only)", "scan in static and all mobility condition", and/or the like.

In some demonstrative embodiments, scan policy manager 134 may determine the scan policy based on the velocity of mobile device 120, the coordinates of mobile device 120, and/or any other indicator of the mobility state of mobile device 120.

In some demonstrative embodiments, scan policy manager 134 may define the scan policy according to factory settings. For example, the factory settings may be embedded in scan policy manager 134 at time of production of mobile device 120.

In some demonstrative embodiments, scan policy manager 134 may define the scan policy according to user configurations. For example, the user of mobile device 120 may determine via interface 122 to "scan in all mobility states", "scan at home only", "scan in static movement state only", "scan in static movement state and train environment", and/or the like.

For example, scan policy manager 134 may define the scan policy which enables the wireless scanning only in the static movement state of mobile device 120, for example, if the user of mobile device 120 determines to enable the wireless scanning only at the static movement state of mobile device 120.

In some demonstrative embodiments, scan policy manager 134 may define the scan policy according to a remote device management procedure. For example, scan policy manager 134 may define the scan policy according to an update, which may be received by scan policy manager 134 from the network operator.

In some demonstrative embodiments, scan policy manager 134 may define the scan policy according to any other external set of instructions.

In some demonstrative embodiments, scan policy manager 134 may define the scan policy according to a specific mobility state of mobile device 120.

For example, scan policy manager 134 may define the scan policy to enable or disable the wireless scanning in the static mobility state of mobile device 120, in the pedestrian mobility state of mobile device 120, in the train mobility state of mobile device 120, and/or in any other mobility state of mobile device 120.

In some demonstrative embodiments, scan policy manager 134 may define the scan policy according to the movement state of mobile device 120.

For example, scan policy manager 134 may define the scan policy to enable a single active wireless scanning, for example, if scan controller 128 detects the plane movement state of mobile device 120.

In some demonstrative embodiments, scan policy manager 134 may define the scan policy according to the environment of mobile device 120.

For example, scan policy manager 134 may define the scan policy to enable the wireless scanning in the home environment state of mobile device 120.

In some demonstrative embodiments, scan policy manager 134 may define the scan policy according to the mobility tag of AP 104.

For example, scan policy manager 134 may define the scan policy to disable the wireless scanning of APs tagged "Transport", for example, if the home environment state of mobile device 120 is detected.

In some demonstrative embodiments, scan policy manager 134 may update the scan policy, e.g., as described below.

In some demonstrative embodiments, scan policy manager 134 may update the scan policy based on a monitored wireless connectivity state of mobile device 120.

In some demonstrative embodiments, scan policy manager 134 may update the scan policy based on previous scans and/or the mobility state of mobile device 120, for example, based on a monitored Wi-Fi utilization by the user of mobile device 120.

In one example, scan policy manager 134 may set the scan policy to "scan only in static condition", for example, if the user of mobile device 120 never enables a Wi-Fi connection and/or never connects to the Wi-Fi network in the non-static movement state of mobile device 120.

In another example, scan policy manager 134 may set the scan policy to "scan in static and mobility condition (train only)", for example, if the user of mobile device 120 connects to AP 104 on a train.

In some demonstrative embodiments, scan controller 128 may ignore the scan policy defined by scan policy manager 134.

For example, the user of mobile device 120 may wear one or more wearable devices, e.g., smart glasses, a smart watch, and the like, which may interconnect with each other and/or with mobile device 120 via the wireless network. According to this example, scan controller 128 may initiate the wireless scanning for one or more wearable devices, e.g., independent of the scan policy defined by scan policy manager 134.

In some demonstrative embodiments, scan controller 128 may include a scan manager 136 configured to control the wireless scanning, e.g., by radio 124.

In some demonstrative embodiments, scan manager 136 may be configured to determine scan pattern 135 based on the mobility state of mobile device 120, e.g., to control the wireless scanning.

For example, scan manager 136 may determine scan pattern 135 to maintain the wireless scanning for X seconds, pause for Y seconds, scan for Z seconds, and stop until the mobility state of mobile device 120 changes.

In some demonstrative embodiments, scan manager 136 may be configured to determine scan pattern 135 based on one or more input from location monitor 138, mobility factor monitor 140, scan policy manager 134, and/or AP database 132, e.g., as described below.

In some demonstrative embodiments, scan manager 136 may determine scan pattern 135 based on a combination of the velocity of mobile device 120, the movement state of mobile device 120, the environment of mobile device 120, the vehicle state of mobile device 120, and/or any other indicators of the mobility state of mobile device 120, e.g., as described below.

In some demonstrative embodiments, scan manager 136 may determine scan pattern 135 based on the environment of mobile device 120.

For example, scan manager 136 may determine scan pattern 135 to include the active scan for AP 104, for example, if the environment type of the mobility state of mobile device 120 corresponds to the environment of AP 104.

In some demonstrative embodiments, scan manager 136 may determine scan pattern 135 based on the vehicle state of mobile device 120.

In one example, scan manager 136 may determine a first scan pattern, for example, if the mobility state of mobile device 120 includes a first vehicle state corresponding to a first vehicle type.

In another example, scan manager 136 may determine a second scan pattern, different from the first scan pattern, when the mobility state of the mobile device includes a second vehicle state corresponding to a second vehicle type.

For example, the first scan pattern may include a pattern assigned to a train, and the second scan pattern may include a pattern assigned to a car.

In some demonstrative embodiments, scan manager 136 may determine scan pattern 135 based on the scan policy, e.g., provided by scan policy manager 134.

For example, scan manager 136 may determine scan pattern 135 to initiate the active wireless scanning for AP 104 tagged "Public transport train", for example, if scan policy manager 134 provides the scan policy "scan in static and mobility condition (train only)".

In some demonstrative embodiments, scan manager 136 may determine scan pattern 135 based on the movement of mobile device 120 relative to AP 104.

In some demonstrative embodiments, scan manager 136 may determine the movement of mobile device 120 relative to AP 104, e.g., based on at least one change in a power level of signals from AP 104, and/or a change in a difference between a location of mobile device 120 and a location of AP 104.

For example, scan manager 136 may determine scan pattern 135 corresponding to the train mobility state, for example, if scan manager 136 detects a relatively high velocity of mobile device 120, and a low movement speed of mobile device 120 relative to AP 104.

In some demonstrative embodiments, scan manager 136 may update scan pattern 135 corresponding to the current mobility state of mobile device 120. For example, scan pattern 135 may change, for example, if the mobility state of mobile device 120 changes.

For example, scan pattern 135 may define to increase or decrease the periodicity and/or the frequency of the wireless scanning, e.g., based on a change in the mobility state of mobile device 120.

In some demonstrative embodiments, scan manager 136 may trigger the wireless scanning, e.g., based on one or more input from location monitor 138, mobility factor monitor 140, scan policy manager 134, and/or AP database 132.

In some demonstrative embodiments, scan manager 136 may trigger the wireless scanning, e.g., based on a power level of a wireless signal, and/or on one or more indicators of the mobility state of mobile device 120.

For example, scan manager 136 may detect no cellular coverage, when mobile device 120 is in a mall, and/or any other building. Accordingly, scan manager 136 may determine scan pattern 135, e.g., based on input from mobility factor monitor 140. In one example, scan manager 136 may trigger a single wireless scanning, when mobility factor monitor 140 indicates the static mobility state of mobile device 120. In another example, scan manager 136 may trigger a more frequent wireless scanning, e.g., when mobility factor monitor 140 indicates the pedestrian mobility state of mobile device 120.

Some demonstrative embodiments may be configured to perform the wireless scanning to trigger a handover between wireless networks.

In one example, scan manager 136 may trigger the wireless scanning, for example, in order to perform the handover from a cellular network to a Wi-Fi network.

In another example, scan manager 136 may trigger the wireless scanning, for example, in order to perform the handover from a first Wi-Fi network to a second Wi-Fi network.

In another example, scan manager 136 may trigger the wireless scanning, for example, in order to perform the handover from the Wi-Fi network to the cellular network.

In some demonstrative embodiments, scan manager 136 may trigger the wireless scanning, for example, if the power level of the wireless signal of AP 104 is above a configured threshold.

In some demonstrative embodiments, scan manager 136 may configure a Wi-Fi power level threshold to trigger the handover between the wireless networks.

In some demonstrative embodiments, scan manager 136 may configure the Wi-Fi power level threshold, e.g., based on the velocity of mobile device 120.

For example, scan manager 136 may set a high Wi-Fi power level threshold to perform a relatively fast handover, for example, if the velocity of mobile device 120 is relatively high.

In some demonstrative embodiments, scan manager 136 may select to completely switch off Wi-Fi related software or hardware components related to the wireless scanning, for example, based on one or more indicators of the mobility state of mobile device 120.

In some demonstrative embodiments, scan manager 136 may select to completely switch off Wi-Fi related software or hardware components related to the wireless scanning, e.g., based on the combination of the velocity of mobile device 120, the movement state of mobile device 120, the environment of mobile device 120, the vehicle state of the mobility state of mobile device 120, and/or any other indicators of the mobility state of mobile device 120.

In one example, scan manager 136 may select to completely switch off Wi-Fi related software or hardware components related to the wireless scanning, for example, if scan manager 136 detects the car mobility state of mobile device 120, and no APs are detected.

In another example, scan manager 136 may select to completely switch off Wi-Fi related software or hardware components related to the wireless scanning, for example, if scan manager 136 detects a non-urban and an unknown environment of mobile device 120.

In some demonstrative embodiments, scan manager 136 may associate the mobility state of mobile device 120 with the environment of AP 104. For example, scan manager 136 may associate the velocity and the location of mobile device 120 with a location of AP 104.

In some demonstrative embodiments, scan manager 136 may associate the mobility state of mobile device 120 with the environment of AP 104, e.g., based on information received from mobility factor monitor 140, location monitor 138, AP database 132, and/or scan policy manager 134.

In some demonstrative embodiments, scan manager 136 may apply scan pattern 135, e.g., based on association between the mobility state of mobile device 120 and the environment of AP 104, e.g., as follows:

TABLE 1

| | | Environment type | | |
|---|---|---|---|---|
| | | Known place with WiFi (Home/Work) | Unknown place - non urban | Unknown place - urban (mall, friends place, pub . . . ) |
| Device mobility | Static | Initial scan to search for AP: active scan for known home/work AP if not found, passive scan for x seconds then stop | No scan | Passive scan for x seconds, then stop |
| | | Known place with WiFi (Work/Mall) | Unknown place - non urban | Unknown place - urban indoor public place |
| | Pedestrian - walking | if known AP for this place, search for AP. As optimization, only AP with a "pedestrian" mobility tag could be searched if no known AP, no scan | No scan | AP search can be triggered, scan rate may depend on speed (if speed higher for instance when moving from one shop to another shop, trigger scan more frequently as if user is simply standing around in the same shop) If AP is found in mobility scenario, location may be stored and scan may be triggered again in same area even if user is moving. Could be used as well to automatically set the tag "mall" in the Wi-Fi profile |
| | | Personal car | Public transport with WiFi support | Unknown transport |
| | Transport - car/bus | if personal car don't have WiFi, no scan if personal car have WiFi, scan only personal car AP | Scan for AP from the public transport company (could be pre-provisioned in the device. Public transport could be detected by different means, for instance if the device is used to validate the transport ticket). If no AP from public transport company provisioned, initiate passive scan for short duration then stop | No scan |
| | | Train - Know route (daily route to work) | Train - unknown route - known company | Unknown train |
| | Transport - train | if WiFi profile(s) with mobility tag "train" is provisioned, only search for these APs. if one specific profile is known to be used on this route, this profile can be searched first if not found, stop scan | Train company known to support WiFi. Generic profile company provisioned in the phone. Search first the company profile, then profile with mobility tag "train", then passive scan. Note: a mean to know the company could be when validating the transport ticket using the device. This could also be with a proximity sensor when entering the train | Initiate background for short period. If no AP found, stop scan. If AP found, the AP profile can be stored along with a mobility tag "train". AP with mobility tag "train" does not need to be searched for in other mobility condition. The route can also be monitored and stored in order to optimize further scan on the same route |

TABLE 1-continued

| | Environment type | |
|---|---|---|
| | Plane - known company | Unknown plane |
| Transport - plane | Known airplane company (can be detected for instance when validating the transport ticket at the gate) supporting WiFi in airplane. When "plane" mobility is detected, search in priority AP with WiFi profile(s) with mobility tag "plane" for this company, the other AP with mobility tag as "plane", then initiate short passive scan. Same sequence can be repeated 15 minutes after take off (in case WLAN access is enabled only some time after take-off) If company known not to support WiFi, no scan triggered | When "plane" mobility is detected, search in priority AP with WiFi profile(s) with mobility tag "plane", then initiate short passive scan. Same sequence can be repeated 15 minutes after take off (in case WLAN access is enabled only some time after take-off) In case a new AP is detected, then a new WiFi profile can be saved for this profile with a mobility tag set to "transport-plane". AP with mobility tag "transport-plane" will only be searched in transport-plane mobility condition. (Note: it may be possible for a profile to have similar mobility tag, for instance if a company is using a same profile for all AP in plane and in company lounge. In such case, the profile may have a static and a transport mobility tag) |

Figure 2:
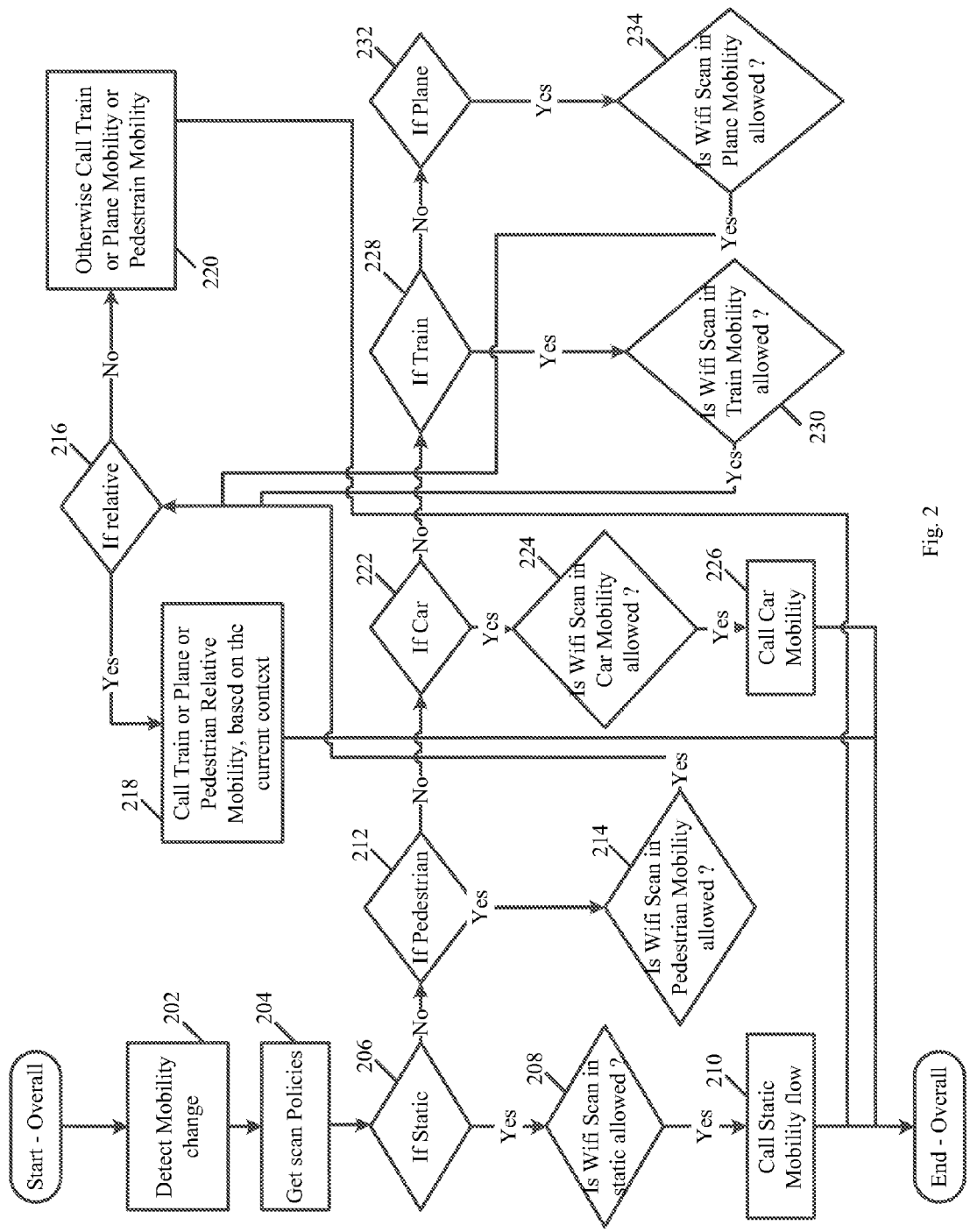
FIG. 2 is a schematic flow chart illustration of a method of controlling wireless scanning, in accordance with some demonstrative embodiments.

Reference now is made to FIG. 2, which schematically illustrates a method of controlling wireless scanning, in accordance with some demonstrative embodiments. For example, one or more operations of the method of FIG. 2 may be performed by a system, e.g., system 100 (FIG. 1), a mobile device, e.g., mobile device 120 (FIG. 1), an AP, e.g., AP 104 (FIG. 1), a scan controller, e.g., scan controller 128 (FIG. 1), and/or a radio, e.g., radio 124 (FIG. 1).

As indicated at block 202, the method may include detecting a change in a mobility state of the mobile device. For example, scan controller 128 (FIG. 1) may detect the change in the mobility state of mobile device 120 (FIG. 1), e.g., based on information received from information providers 126 (FIG. 1).

As indicated at block 204, the method may include determining a scan policy corresponding to the mobility state of the mobile device. For example, scan controller 128 (FIG. 1) may determine the scan policy corresponding to the mobility state of mobile device 120 (FIG. 1), e.g., as described above.

As indicated at block 206, the method may include determining whether the mobility state of the mobile device is a static state. For example, scan controller 128 (FIG. 1) may determine whether the mobility state of mobile device 120 (FIG. 1) is the static state, e.g., as described above.

As indicated at block 208, the method may include determining whether a wireless scanning is allowed, for example, if the static mobility state of the mobile device is detected. For example, scan controller 128 (FIG. 1) may determine whether the wireless scanning is allowed, for example, if scan controller 128 (FIG. 1) detects the static mobility state of mobile device 120 (FIG. 1), e.g., as described above.

As indicated at block 210, the method may include applying a scan pattern corresponding to the static mobility state of the mobile device. For example, scan controller 128 (FIG. 1) may apply scan pattern 135 (FIG. 1) corresponding to the static mobility state of mobile device 120 (FIG. 1), e.g., as described below with reference to FIG. 4.

As indicated at block 212, the method may include determining whether the mobility state of the mobile device is a pedestrian state, for example, if no static mobility state of the mobile device is detected. For example, scan controller 128 (FIG. 1) may determine whether the mobility state of mobile device 120 (FIG. 1) is the pedestrian state, for example, if scan controller 128 (FIG. 1) detects no static mobility state of mobile device 120 (FIG. 1), e.g., as described above.

As indicated at block 214, the method may include determining whether the wireless scanning in the pedestrian mobility state of the mobile device is allowed, for example, if the pedestrian mobility state of the mobile device is detected. For example, scan controller 128 (FIG. 1) may determine whether the wireless scanning in the pedestrian mobility state of mobile device 120 (FIG. 1) is allowed, for example, if the pedestrian mobility state of the mobile device is detected, e.g., as described above.

As indicated at block 216, the method may include determining whether a movement of the mobile device is relative to the AP, for example, if the wireless scanning in the pedestrian mobility state of the mobile device is allowed. For example, scan controller 128 (FIG. 1) may determine whether the movement of mobile device 120 (FIG. 1) is relative to AP 104 (FIG. 1), for example, if the wireless scanning in the pedestrian mobility state of mobile device 120 (FIG. 1) is allowed, e.g., as described above.

As indicated at block 218, the method may include applying the scan pattern corresponding to a relative pedestrian mobility state of the mobile device, for example, if the movement of the mobile device relative to the AP is detected. For example, scan controller 128 (FIG. 1) may apply scan pattern 135 (FIG. 1) corresponding to the relative pedestrian mobility state of mobile device 120 (FIG. 1), for example, if scan controller 128 (FIG. 1) detects the movement of mobile device 120 (FIG. 1) relative to AP 104 (FIG. 1), e.g., as described below with reference to FIG. 3.

As indicated at block 220, the method may include applying the scan pattern corresponding to the pedestrian mobility state of the mobile device, for example, if no movement of the mobile device relative to the AP is detected. For example, scan controller 128 (FIG. 1) may apply scan pattern 135 (FIG. 1) corresponding to the pedestrian mobility state of mobile device 120 (FIG. 1), for example, if scan controller 128 (FIG. 1) detects no movement of mobile device 120 (FIG. 1) relative to AP 104 (FIG. 1), e.g., as described below with reference to FIG. 5.

As indicated at block 222, the method may include determining whether the mobility state of the mobile device is a car state, for example, if no pedestrian mobility state of the mobile device is detected. For example, scan controller 128 (FIG. 1) may determine whether the mobility state of mobile device 120 (FIG. 1) is the car state, for example, if scan controller 128 (FIG. 1) detects no pedestrian mobility state of mobile device 120 (FIG. 1), e.g., as described above.

As indicated at block 224, the method may include determining whether the wireless scanning in the car mobility state of the mobile device is allowed, for example, if the car mobility state of the mobile device is detected. For example, scan controller 128 (FIG. 1) may determine whether the wireless scanning in the car mobility state of mobile device 120 (FIG. 1) is allowed, for example, if scan controller 128 (FIG. 1) detects the car mobility state of mobile device 120 (FIG. 1), e.g., as described above.

As indicated at block 226, the method may include applying the scan pattern corresponding to the car mobility state of the mobile device, for example, if the wireless scanning in the car mobility state of the mobile device is allowed. For example, scan controller 128 (FIG. 1) may apply scan pattern 135 (FIG. 1) corresponding to the car mobility state of mobile device 120 (FIG. 1), for example, if the wireless scanning in the car mobility state of mobile device 120 (FIG. 1) is allowed, e.g., as described below with reference to FIG. 6.

As indicated at block 228, the method may include determining whether the mobility state of the mobile device is a train mobility state, for example, if no car mobility state of the mobile device is detected. For example, scan controller 128 (FIG. 1) may determine whether the mobility state of mobile device 120 (FIG. 1) is the train mobility state, for example, if scan controller 128 (FIG. 1) detects no car mobility state of mobile device 120 (FIG. 1), e.g., as described above.

As indicated at block 230, the method may include determining whether the wireless scanning in the train mobility state of the mobile device is allowed, for example, if the train mobility state of the mobile device is detected. For example, scan controller 128 (FIG. 1) may determine whether the wireless scanning in the train mobility state of mobile device 120 (FIG. 1) is allowed, for example, if scan controller 128 (FIG. 1) detects the train mobility state of mobile device 120 (FIG. 1), e.g., as described above.

As indicated at block 216, the method may include determining whether a movement of the mobile device is relative to the AP, for example, if the wireless scanning in the train mobility state of the mobile device is allowed. For example, scan controller 128 (FIG. 1) may determine whether the movement of mobile device 120 (FIG. 1) is relative to AP 104 (FIG. 1), for example, if the wireless scanning in the train mobility state of mobile device 120 (FIG. 1) is allowed, e.g., as described above.

As indicated at block 218, the method may include applying the scan pattern corresponding to a relative train mobility state of the mobile device, for example, if the movement of the mobile device relative to the AP is detected. For example, scan controller 128 (FIG. 1) may apply scan pattern 135 (FIG. 1) corresponding to the relative train mobility state of mobile device 120 (FIG. 1), for example, if scan controller 128 (FIG. 1) detects the movement of mobile device 120 (FIG. 1) relative to AP 104 (FIG. 1), e.g., as described below with reference to FIG. 3.

As indicated at block 220, the method may include applying the scan pattern corresponding to the train mobility state of the mobile device, for example, if no movement of the mobile device relative to the AP is detected. For example, scan controller 128 (FIG. 1) may apply scan pattern 135 (FIG. 1) corresponding to the train mobility state of mobile device 120 (FIG. 1), for example, if scan controller 128 (FIG. 1) detects no movement of mobile device 120 (FIG. 1) relative to AP 104 (FIG. 1), e.g., as described below with reference to FIG. 7.

As indicated at block 232, the method may include determining whether the mobility state of the mobile device is an airplane state, for example, if no train mobility state of the mobile device is detected. For example, scan controller 128 (FIG. 1) may determine whether the mobility state of mobile device 120 (FIG. 1) is the airplane state, for example, if scan controller 128 (FIG. 1) detects no train mobility state of mobile device 120 (FIG. 1), e.g., as described above.

As indicated at block 234, the method may include determining whether the wireless scanning in the airplane mobility state of the mobile device is allowed, for example, if the airplane mobility state of the mobile device is detected. For example, scan controller 128 (FIG. 1) may determine whether the wireless scanning in the plane mobility state of mobile device 120 (FIG. 1) is allowed, for example, if scan controller 128 (FIG. 1) detects the airplane mobility state of mobile device 120 (FIG. 1), e.g., as described above.

As indicated at block 216, the method may include determining whether a movement of the mobile device is relative to the AP, for example, if the wireless scanning in the airplane mobility state of the mobile device is allowed. For example, scan controller 128 (FIG. 1) may determine whether the movement of mobile device 120 (FIG. 1) is relative to AP 104 (FIG. 1), for example, if the wireless scanning in the airplane mobility state of mobile device 120 (FIG. 1) is allowed, e.g., as described above.

As indicated at block 218, the method may include applying the scan pattern corresponding to a relative airplane mobility state of the mobile device, for example, if the movement of the mobile device relative to the AP is detected. For example, scan controller 128 (FIG. 1) may apply scan pattern 135 (FIG. 1) corresponding to the relative airplane mobility state of mobile device 120 (FIG. 1), for example, if scan controller 128 (FIG. 1) detects the movement of mobile device 120 (FIG. 1) relative to AP 104 (FIG. 1), e.g., as described below with reference to FIG. 3.

As indicated at block 220, the method may include applying the scan pattern corresponding to the airplane mobility state of the mobile device, for example, if no movement of the mobile device relative to the AP is detected. For example, scan controller 128 (FIG. 1) may apply scan pattern 135 (FIG. 1) corresponding to the airplane mobility state of mobile device 120 (FIG. 1), for example, if scan controller 128 (FIG. 1) detects no movement of mobile device 120 (FIG. 1) relative to AP 104 (FIG. 1), e.g., as described below with reference to FIG. 8.

Figure 3:
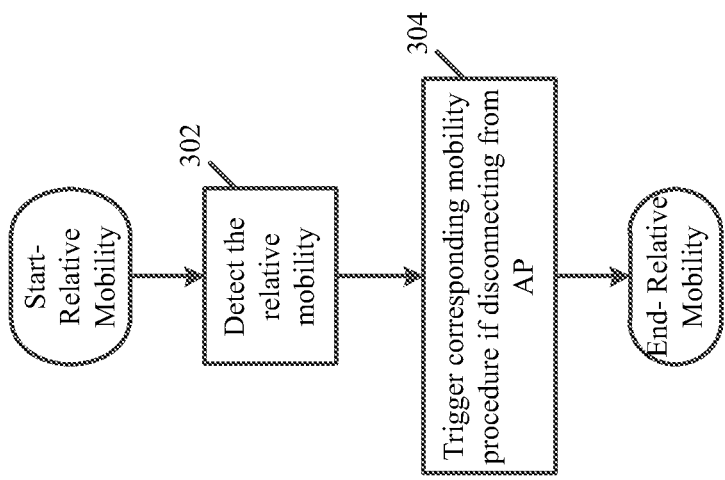
FIG. 3 is a schematic flow chart illustration of a method of determining a scan pattern in a relative mobility state, in accordance with some demonstrative embodiments.

Reference now is made to FIG. 3, which schematically illustrates a method of determining a scan pattern corresponding to a relative mobility state, in accordance with some demonstrative embodiments. For example, one or more operations of the method of FIG. 3 may be performed by a system, e.g., system 100 (FIG. 1), a mobile device, e.g., mobile device 120 (FIG. 1), an AP, e.g., AP 104 (FIG. 1), a scan controller, e.g., scan controller 128 (FIG. 1), and/or a radio, e.g., radio 124 (FIG. 1).

In some demonstrative embodiments, one or more operations of the method of FIG. 3 may be performed as a part of a method of controlling wireless scanning, e.g., as described above with reference to block 218 (FIG. 2).

As indicated at block 302, the method may include detecting a movement of the mobile device relative to the AP. For example, scan controller 128 (FIG. 1) may detect the movement of mobile device 120 (FIG. 1) relative to AP 104 (FIG. 1), e.g., as described above.

As indicated at block 304, the method may include determining the scan pattern corresponding to a mobility state of the mobile device, e.g., based on the movement of the mobile device relative to the AP, for example, if the mobile device disconnects or is going to disconnect from a current AP. For example, scan controller 128 (FIG. 1) may determine scan pattern 135 (FIG. 1) corresponding to the mobility state of mobile device 120 (FIG. 1), e.g., based on the movement of mobile device 120 (FIG. 1) relative to AP 104 (FIG. 1), for example, if mobile device 120 (FIG. 1) disconnects or is going to disconnect from AP 104 (FIG. 1). For example, scan controller 128 (FIG. 1) may perform a wireless scanning for a new AP before mobile device 120 (FIG. 1) disconnects from AP 104 (FIG. 1), e.g., based on information received from information providers 126 (FIG. 1).

Figure 4:
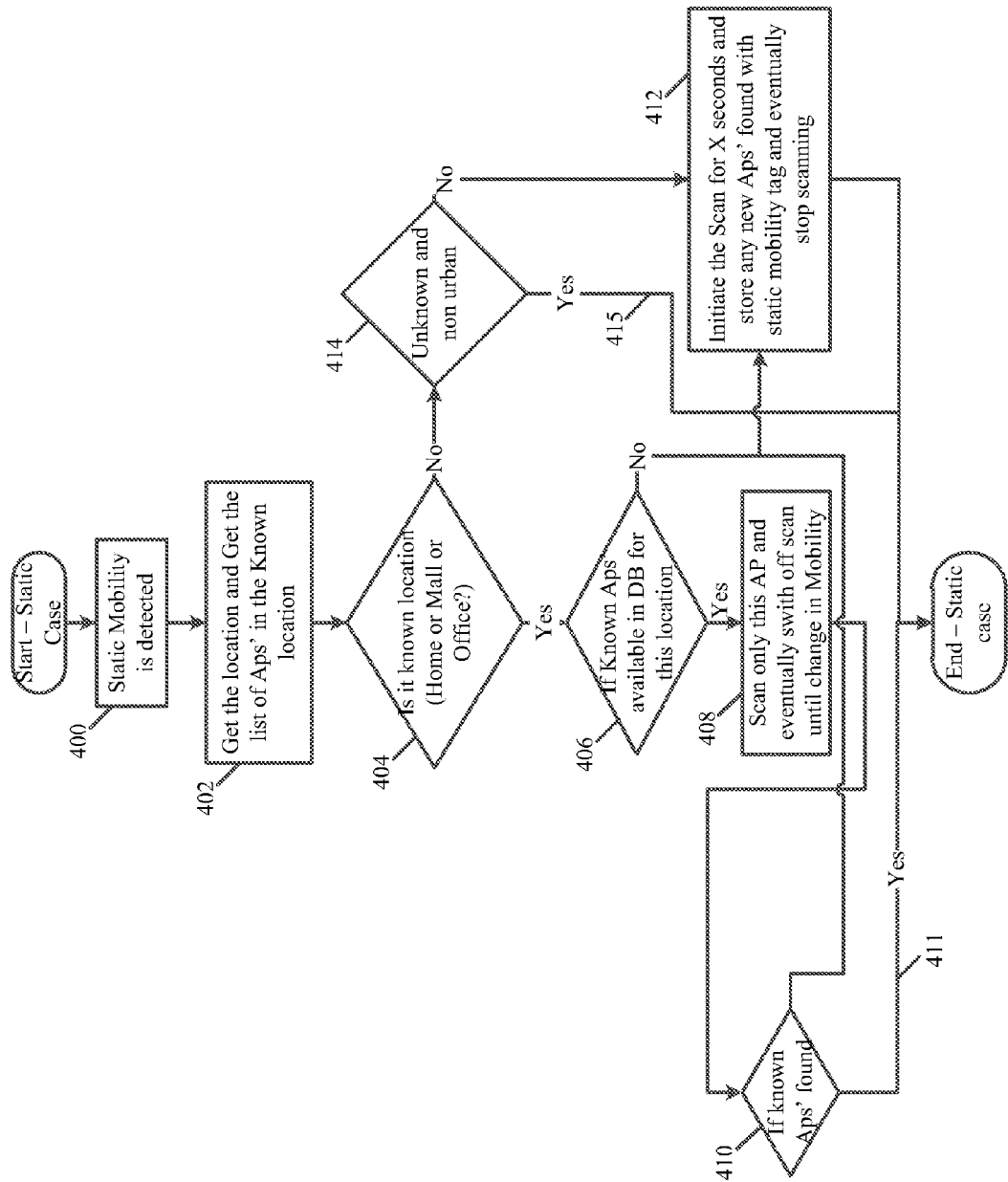
FIG. 4 is a schematic flow chart illustration of a method of determining a scan pattern in a static state, in accordance with some demonstrative embodiments.

Reference now is made to FIG. 4, which schematically illustrates a method of determining a scan pattern corresponding to a static state, in accordance with some demonstrative embodiments. For example, one or more operations of the method of FIG. 4 may be performed by a system, e.g., system 100 (FIG. 1), a mobile device, e.g., mobile device 120 (FIG. 1), an AP, e.g., AP 104 (FIG. 1), a scan controller, e.g., scan controller 128 (FIG. 1), and/or a radio, e.g., radio 124 (FIG. 1).

In some demonstrative embodiments, one or more operations of the method of FIG. 4 may be performed as a part of a method of controlling wireless scanning, e.g., as described above with reference to block 210 (FIG. 2).

As indicated at block 400, the method may include detecting a static state of the mobile device. For example, scan controller 128 (FIG. 1) may detect the static state of mobile device 120 (FIG. 1), e.g., as described above.

As indicated at block 402, the method may include determining a location of the mobile device, and/or receiving a list of APs tagged "static" from an AP database. For example, scan controller 128 (FIG. 1) may determine the location of mobile device 120 (FIG. 1), and/or receive the list of APs tagged "static" (FIG. 1) from AP database 132 (FIG. 1), e.g., as described above.

As indicated at block 404, the method may include determining whether a current environment of the mobile device is a known environment type. For example, scan controller 128 (FIG. 1) may determine whether the current environment of mobile device 120 (FIG. 1) is the known environment type, e.g., a home environment, a mall environment, an office environment, or any other known environment type.

As indicated at block 406, the method may include determining whether the AP database includes at least one AP matching the current environment of the mobile device, for example, if the current environment of the mobile device is the known environment type. For example, scan controller 128 (FIG. 1) may determine whether AP database 132 (FIG. 1) includes at least AP 104 (FIG. 1) matching the current environment of mobile device 120 (FIG. 1), for example, if the current environment of mobile device 120 (FIG. 1) is the known environment type, e.g., as described above.

As indicated at block 408, the method may include initializing the wireless scanning for the AP matching the current environment of the mobile device, and switching off the wireless scanning until a change in a mobility state of the mobile device, for example, if the AP is stored in the AP database. For example, scan controller 128 (FIG. 1) may initialize the wireless scanning for AP 104 (FIG. 1) matching the current environment of mobile device 120 (FIG. 1), and may switch off the wireless scanning until the change in the mobility state of mobile device 120 (FIG. 1), for example, if AP 104 (FIG. 1) is stored in AP database 132 (FIG. 1), e.g., as described above.

As indicated at block 410, the method may include determining whether the wireless scanning detects the AP matching the current environment of the mobile device. For example, scan controller 128 (FIG. 1) may determine whether the wireless scanning detects AP 104 (FIG. 1) matching the current environment of mobile device 120 (FIG. 1), e.g., as described above.

As indicated by arrow 411, the method may include disabling the wireless scanning, for example, if the AP matching the current environment of the mobile device is detected. For example, scan controller 128 (FIG. 1) may disable the wireless scanning, for example, if scan controller 128 (FIG. 1) detects AP 104 (FIG. 1) matching the current environment of mobile device 120 (FIG. 1).

As indicated at block 412, the method may include initiating the wireless scanning for a predefined number, denoted X, of seconds, and storing a detected AP in the AP database under a mobility tag "static", for example, if no APs matching the current environment of the mobile device are listed in the AP database, or no APs suitable for the current environment of the mobile device are detected. For example, scan controller 128 (FIG. 1) may initiate the wireless scanning for X seconds, and store detected AP 104 (FIG. 1) in AP database 132 (FIG. 1) under the mobility tag "static", for example, if no APs matching the current environment of mobile device 120 (FIG. 1) are listed in AP database 132 (FIG. 1), or scan controller 128 (FIG. 1) detects no APs suitable for the current environment of mobile device 120 (FIG. 1).

As indicated at block 414, the method may include determining whether the current environment of the mobile device is an unknown and non-urban environment, for example, if no known environment type of the current environment of the mobile device is detected. For example, scan controller 128 (FIG. 1) may determine whether the current environment of mobile device 120 (FIG. 1) is the unknown and non-urban environment, for example, if scan controller 128 (FIG. 1) detects no known environment type of the current environment of mobile device 120 (FIG. 1). For example, scan controller 128 (FIG. 1) may determine the unknown and non-urban environment based on information received from information providers 126 (FIG. 1).

As indicated by arrow 415, the method may include determining not to initialize the wireless scanning, for example, if the current environment of the mobile device is the unknown and non-urban environment. For example, scan controller 128 (FIG. 1) may determine not to initialize the wireless scanning, for example, if the current environment of mobile device 120 (FIG. 1) is the unknown and non-urban environment, e.g., as described above.

As indicated at block 412, the method may include initiating the wireless scanning for X seconds, and storing a detected AP in the AP database under the mobility tag "static", for example, if the current environment of the mobile device is the unknown and urban environment. For example, scan controller 128 (FIG. 1) may initiate the wireless scanning for X seconds, and store detected AP 104 (FIG. 1) in AP database 132 (FIG. 1) under the mobility tag "static", for example, if the current environment of mobile device 120 (FIG. 1) is the unknown and urban environment. For example, scan controller 128 (FIG. 1) may determine the urban environment based on a list of places where a Wi-Fi is supported.

Figure 5:
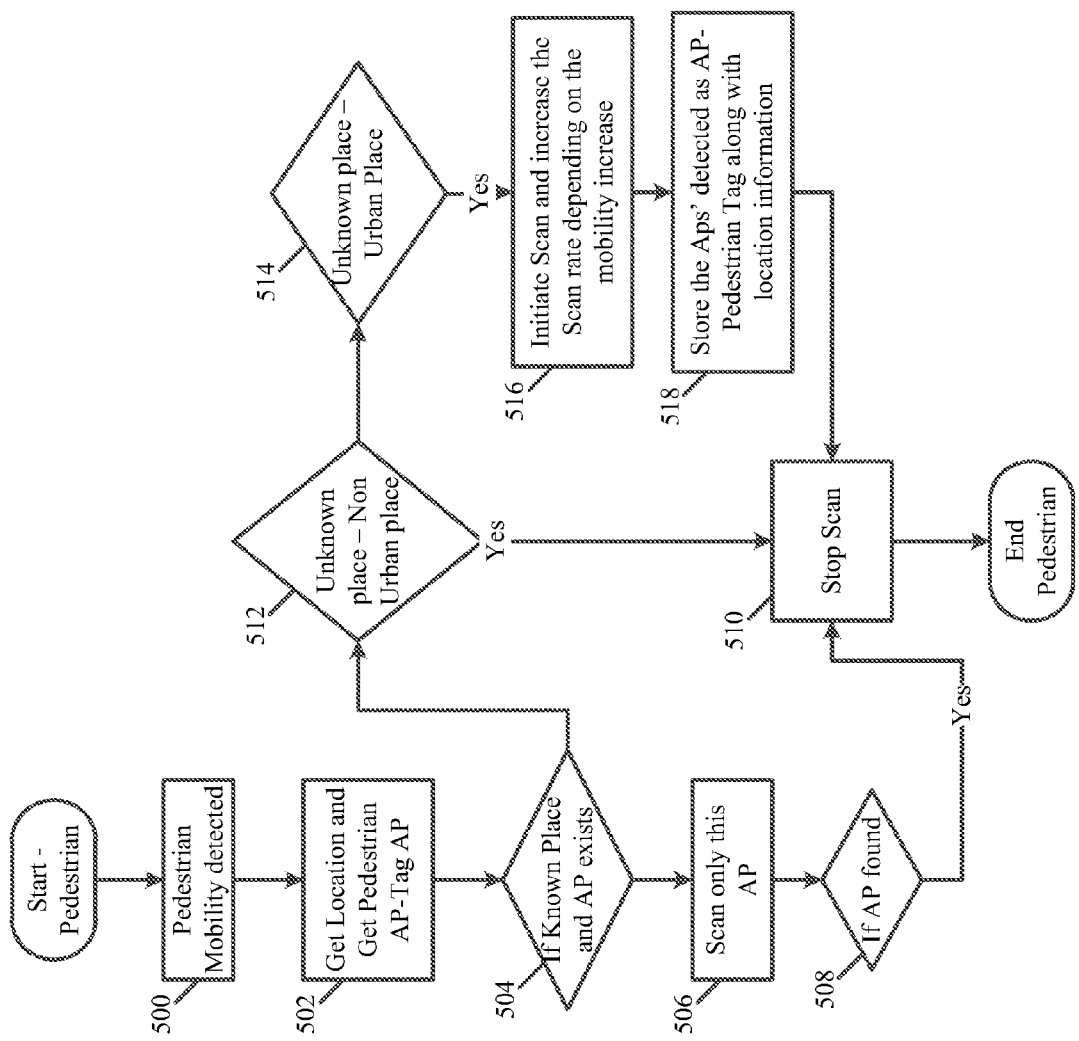
FIG. 5 is a schematic flow chart illustration of a method of determining a scan pattern in a pedestrian state, in accordance with some demonstrative embodiments.

Reference now is made to FIG. 5, which schematically illustrates a method of determining a scan pattern corresponding to a pedestrian state, in accordance with some demonstrative embodiments. For example, one or more operations of the method of FIG. 5 may be performed by a system, e.g., system 100 (FIG. 1), a mobile device, e.g., mobile device 120 (FIG. 1), an AP, e.g., AP 104 (FIG. 1), a scan controller, e.g., scan controller 128 (FIG. 1), and/or a radio, e.g., radio 124 (FIG. 1).

In some demonstrative embodiments, one or more operations of the method of FIG. 5 may be performed as a part of a method controlling wireless scanning, e.g., as described above with reference to block 220 (FIG. 2).

As indicated at block 500, the method may include detecting the pedestrian state of the mobile device. For example, scan controller 128 (FIG. 1) may detect the pedestrian state of mobile device 120 (FIG. 1), e.g., as described above.

As indicated at block 502, the method may include determining a location of the mobile device, and receiving a list of APs tagged "pedestrian" from an AP database. For example, scan controller 128 (FIG. 1) may determine the location of mobile device 120 (FIG. 1), and receive the list of APs tagged "pedestrian" from AP database 132 (FIG. 1), e.g., as described above.

As indicated at block 504, the method may include determining whether a current environment of the mobile device is a known environment, and determining whether the AP database stores the AP matching the current environment of the mobile device. For example, scan controller 128 (FIG. 1) may determine whether the current environment of mobile device 120 (FIG. 1) is the known environment, and scan controller 128 (FIG. 1) may determine whether AP database 132 (FIG. 1) stores AP 104 (FIG. 1) matching the current environment of mobile device 120 (FIG. 1), e.g., as described above.

As indicated at block 506, the method may include initiating the wireless scanning for the AP matching the current environment of the mobile device, for example, if the current environment of the mobile device is the known environment, and the AP is stored in the AP database. For example, scan controller 128 (FIG. 1) may initiate the wireless scanning for AP 104 (FIG. 1) matching the current environment of mobile device 120 (FIG. 1), for example, if scan controller 128 (FIG. 1) determines the current environment of mobile device 120 (FIG. 1) to be the known environment, and AP 104 (FIG. 1) is stored in AP database 132 (FIG. 1), e.g., as described above.

As indicated at block 508, the method may include determining whether the AP matching the current environment of the mobile device is detected. For example, scan controller 128 (FIG. 1) may determine whether AP 104 (FIG. 1) matching the current environment of mobile device 120 (FIG. 1) is detected.

As indicated at block 510, the method may include stopping the wireless scanning, for example, if the AP matching the current environment of the mobile device is detected. For example, scan controller 128 (FIG. 1) may stop the wireless scanning, for example, if scan controller 128 (FIG. 1) detects AP 104 (FIG. 1) matching the current environment of mobile device 120 (FIG. 1), e.g. as described above.

As indicated at block 512, the method may include determining whether the current environment of the mobile device is an unknown and non-urban environment. For example, scan controller 128 (FIG. 1) may determine whether the current environment of mobile device 120 (FIG. 1) is the unknown and non-urban environment, e.g., as described above.

As indicated at block 510, the method may include stopping the wireless scanning, for example, if the current environment of the mobile device is the unknown and non-urban environment. For example, scan controller 128 (FIG. 1) may stop the wireless scanning, for example, if scan controller 128 (FIG. 1) detects the current environment of mobile device 120 (FIG. 1) to be the unknown and non-urban environment, e.g., as described above.

As indicated at block 514, the method may include determining whether the current environment of the mobile device is the unknown and urban environment. For example, scan controller 128 (FIG. 1) may determine whether the current environment of mobile device 120 (FIG. 1) is the unknown and urban environment, e.g., as described above.

As indicated at block 516, the method may include initiating the wireless scanning, and increasing a scanning rate based on a velocity increase of the mobile device, for example, if the current environment of the mobile device is the unknown and urban environment. For example, scan controller 128 (FIG. 1) may initiate the wireless scanning, and increase the scanning rate based on the velocity increase of mobile device 120 (FIG. 1), for example, if scan controller 128 (FIG. 1) detects the current environment of mobile device 120 (FIG. 1) to be the unknown and urban environment, e.g., as described above.

As indicated at block 518, the method may include storing a detected AP and a location of the AP in the AP database, and tagging the detected AP under a "pedestrian" mobility tag. For example, scan controller 128 (FIG. 1) may store detected AP 104 (FIG. 1) and the location of AP 104 (FIG. 1) in AP database 132 (FIG. 1), and scan controller 128 (FIG. 1) may tag detected AP 104 (FIG. 1) under the "pedestrian" mobility tag, e.g., as described above.

Figure 6:
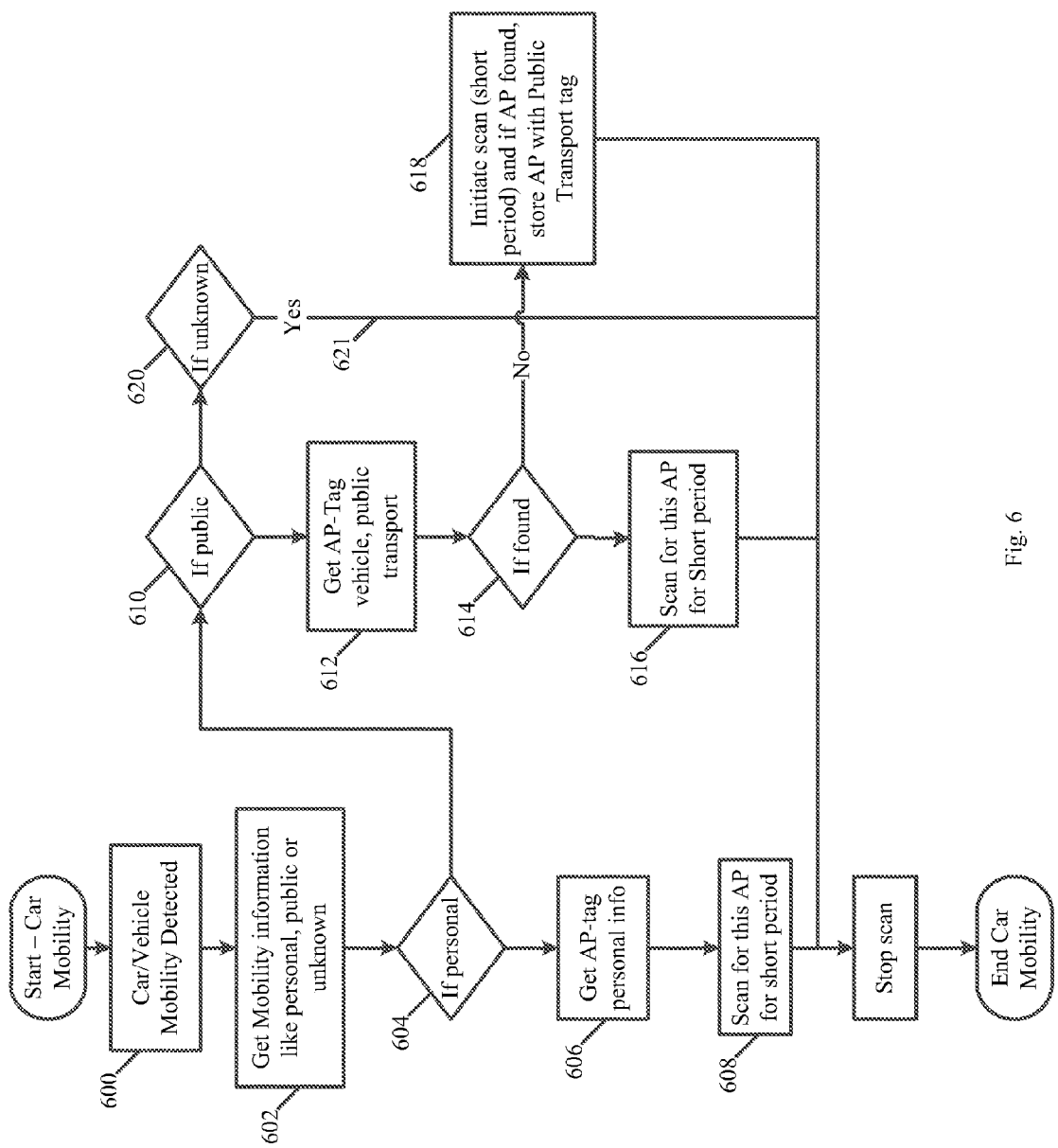
FIG. 6 is a schematic flow chart illustration of a method of determining a scan pattern in a car state, in accordance with some demonstrative embodiments.

Reference now is made to FIG. 6, which schematically illustrates a method of determining a scan pattern corresponding to a car state, in accordance with some demonstrative embodiments. For example, one or more operations of the method of FIG. 6 may be performed by a system, e.g., system 100 (FIG. 1), a mobile device, e.g., mobile device 120 (FIG. 1), an AP, e.g., AP 104 (FIG. 1), a scan controller, e.g., scan controller 128 (FIG. 1), and/or a radio, e.g., radio 124 (FIG. 1).

In some demonstrative embodiments, one or more operations of the method of FIG. 6 may be performed as a part of a method controlling wireless scanning, e.g., as described above with reference to block 226 (FIG. 2).

As indicated at block 600, the method may include detecting the car state of the mobile device. For example, scan controller 128 (FIG. 1) may detect the car state of mobile device 120 (FIG. 1), e.g., as described above.

As indicated at block 602, the method may include determining a vehicle type of the car state of the mobile device. For example, scan controller 128 (FIG. 1) may determine the vehicle type of the car state of mobile device 120 (FIG. 1), e.g., a personal car, a public transport, an unknown vehicle, and/or the like.

As indicated at block 604, the method may include determining whether the vehicle type of the car state of the mobile device is a personal car. For example, scan controller 128 (FIG. 1) may determine whether the vehicle type of the car state of mobile device 120 (FIG. 1) is the personal car. For example, scan controller 128 (FIG. 1) may determine the vehicle type of the car state of mobile device 120 (FIG. 1) to be the personal car based on a Near Field Communication (NFC) of mobile device 120 (FIG. 1) with an NFC element in the personal car, a BT communication of mobile device 120 (FIG. 1) with a BT device, e.g., a BT handsfree device in the personal car, and/or any other element.

As indicated at block 606, the method may include receiving the AP tagged "personal car" from an AP database, for example, if the vehicle type of the car state of the mobile device is the personal car. For example, scan controller 128 (FIG. 1) may receive AP 104 (FIG. 1) tagged "personal car" from AP database 132 (FIG. 1), for example, if scan controller 128 (FIG. 1) determines the vehicle type of the car state of mobile device 120 (FIG. 1) to be the personal car, e.g., as described above.

As indicated at block 608, the method may include initializing a short wireless scanning for the AP tagged "personal car". For example, scan controller 128 (FIG. 1) may initialize the short wireless scanning for AP 104 (FIG. 1) tagged "personal car".

As indicated at block 610, the method may include determining whether the vehicle type of the car state of the mobile device is a public transport, for example, if no personal car type of the car state of the mobile device is detected. For example, scan controller 128 (FIG. 1) may determine whether the vehicle type of the car state of mobile device 120 (FIG. 1) is the public transport, for example, if scan controller 128 (FIG. 1) detects no personal car type of the car state of mobile device 120 (FIG. 1).

As indicated at block 612, the method may include searching for the AP tagged "public transport" in the AP database, for example, if the vehicle type of the car state of the mobile device is the public transport. For example, scan controller 128 (FIG. 1) may search for AP 104 (FIG. 1) tagged "public transport" in AP database 132 (FIG. 1), for example, if scan controller 128 (FIG. 1) determines the vehicle type of the car state of the mobile device to be the public transport.

As indicated at block 614, the method may include verifying whether the AP database stores the AP tagged "public transport". For example, scan controller 128 (FIG. 1) may verify whether AP database 132 (FIG. 1) stores AP 104 (FIG. 1) tagged "public transport".

As indicated at block 616, the method may include initializing a short wireless scanning for the AP tagged "public transport", for example, if the AP database stores the AP tagged "public transport". For example, scan controller 128 (FIG. 1) may initialize the short wireless scanning for AP 104 (FIG. 1) tagged "public transport", for example, if AP database 132 (FIG. 1) stores AP 104 (FIG. 1) tagged "public transport".

As indicated at block 618, the method may include initiating the short wireless scanning, and storing a detected AP in the AP database under a mobility tag "public transport", for example, if the AP database stores no AP tagged "public transport". For example, scan controller 128 (FIG. 1) may initiate the short wireless scanning, and may store detected AP 104 (FIG. 1) in AP database 132 (FIG. 1) under the mobility tag "public transport", for example, if AP database 132 (FIG. 1) stores no AP 104 (FIG. 1) tagged "public transport".

As indicated at block 620, the method may include determining whether the vehicle type of the car state of the mobile device is the unknown vehicle, for example, if no public transport car type of the car state of the mobile device is detected. For example, scan controller 128 (FIG. 1) may determine whether the vehicle type of the car state of mobile device 120 (FIG. 1) is the unknown vehicle, for example, if scan controller 128 (FIG. 1) detects no public transport car type of the car state of mobile device 120 (FIG. 1).

As indicated by arrow 621, the method may include disabling the wireless scanning, for example, if the unknown vehicle type of the car state of the mobile device is detected. For example, scan controller 128 (FIG. 1) may disable the wireless scanning, for example, if scan controller 128 (FIG. 1) detects the unknown vehicle type of the car state of mobile device 120 (FIG. 1).

Figure 7:
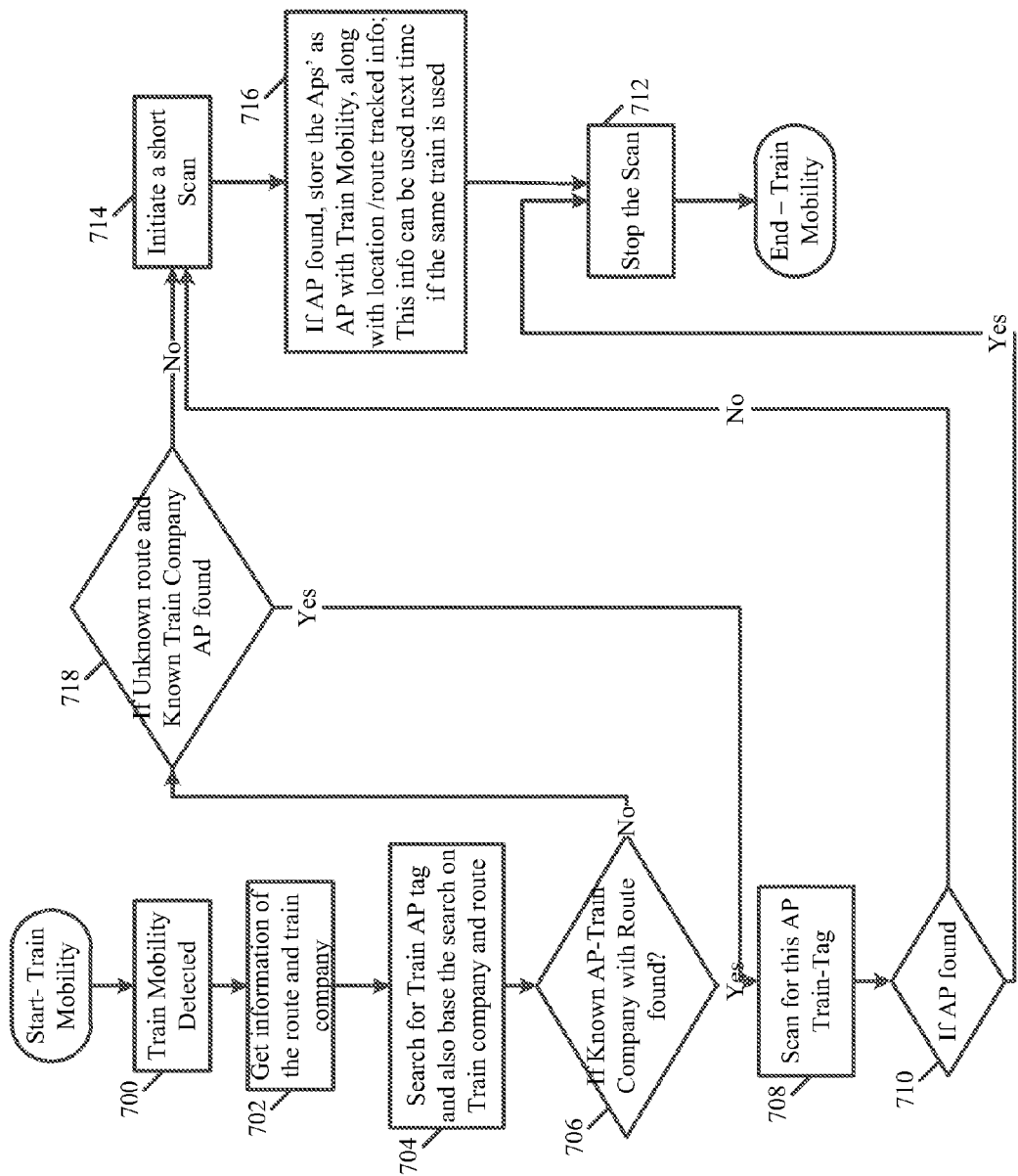
FIG. 7 is a schematic flow chart illustration of a method of determining a scan pattern in a train state, in accordance with some demonstrative embodiments.

Reference now is made to FIG. 7, which schematically illustrates a method of determining a scan pattern corresponding to a train state, in accordance with some demonstrative embodiments. For example, one or more operations of the method of FIG. 7 may be performed by a system, e.g., system 100 (FIG. 1), a mobile device, e.g., mobile device 120 (FIG. 1), an AP, e.g., AP 104 (FIG. 1), a scan controller, e.g., scan controller 128 (FIG. 1), and/or a radio, e.g., radio 124 (FIG. 1).

In some demonstrative embodiments, one or more operations of the method of FIG. 7 may be performed as a part of a method controlling wireless scanning, e.g., as described above with reference to block 220 (FIG. 2).

As indicated at block 700, the method may include detecting a train state of the mobile device. For example, scan controller 128 (FIG. 1) may detect the train state of mobile device 120 (FIG. 1), e.g., as described above.

As indicated at block 702, the method may include receiving information corresponding to a train route and/or a train company. For example, scan controller 128 (FIG. 1) may receive information corresponding to the train route and/or the train company. For example, the information corresponding to the train route and/or the train company may be based on a train ticket number assigned to the train route and/or the train company, a train movement direction, and/or the like.

As indicated at block 704, the method may include searching for an AP tagged "train" in an AP database based on received information corresponding to the train route and/or the train company. For example, scan controller 128 (FIG. 1) may search for AP 104 (FIG. 1) tagged "train" in AP database 132 (FIG. 1) based on received information corresponding to the train route and/or the train company.

As indicated at block 706, the method may include determining whether the AP database stores the AP tagged "train" including information corresponding to the train route and the train company. For example, scan controller 128 (FIG. 1) may determine whether AP database 132 (FIG. 1) stores AP 104 (FIG. 1) tagged "train" including information corresponding to the train route and the train company.

As indicated at block 708, the method may include initiating a wireless scanning for the AP tagged "train", for example, if the AP database stores the AP tagged "train" including information corresponding to the train route and the train company. For example, scan controller 128 (FIG. 1) may initiate the wireless scanning for AP 104 (FIG. 1) tagged "train", for example, if AP database 132 (FIG. 1) stores AP 104 (FIG. 1) tagged "train" including information corresponding to the train route and the train company.

As indicated at block 710, the method may include determining whether the AP tagged "train" is detected. For example, scan controller 128 (FIG. 1) may determine whether AP 104 (FIG. 1) tagged "train" is detected, e.g., as described above.

As indicated at block 712, the method may include stopping the wireless scanning, for example, if the AP tagged "train" is detected. For example, scan controller 128 (FIG. 1) may stop the wireless scanning, for example, if scan controller 128 (FIG. 1) detects AP 104 (FIG. 1) tagged "train", e.g., as described above.

As indicated at block 714, the method may include initiating a short wireless scanning, for example, if no AP tagged "train" is detected. For example, scan controller 128 (FIG. 1) may initiate the short wireless scanning, for example, if scan controller 128 (FIG. 1) detects no AP 104 (FIG. 1) tagged "train", e.g., as described above.

As indicated at block 716, the method may include storing a detected AP in the AP database under a tag "train" including information corresponding to the train route and/or a location of the AP. For example, scan controller 128 (FIG. 1) may store detected AP 104 (FIG. 1) in AP database 132 (FIG. 1) under the tag "train" including information corresponding to the train route and/or the location of AP 104 (FIG. 1).

As indicated at block 718, the method may include determining whether the AP database stores the AP tagged "train" including information corresponding to the train company, for example, if the AP database stores no AP tagged "train" including information corresponding to the train route and the train company. For example, scan controller 128 (FIG. 1) may determine whether AP database 132 (FIG. 1) stores AP 104 (FIG. 1) tagged "train" including information corresponding to the train company, for example, if AP database 132 (FIG. 1) stores no AP 104 (FIG. 1) tagged "train" including information corresponding only to the train company.

As indicated at block 708, the method may include initiating a wireless scanning for the AP tagged "train", for example, if the AP database stores the AP tagged "train" with information corresponding only to the train company. For example, scan controller 128 (FIG. 1) may initiate the wireless scanning for AP 104 (FIG. 1) tagged "train", for example, if AP database 132 (FIG. 1) stores AP 104 (FIG. 1) tagged "train" with information corresponding only to the train company.

As indicated at block 714, the method may include initiating the short wireless scanning, for example, if the AP database stores no AP tagged "train" with information corresponding only to the train company. For example, scan controller 128 (FIG. 1) may initiate the short wireless scanning, for example, if AP database 132 (FIG. 1) stores no AP 104 (FIG. 1) tagged "train" with information corresponding only to the train company.

Figure 8:
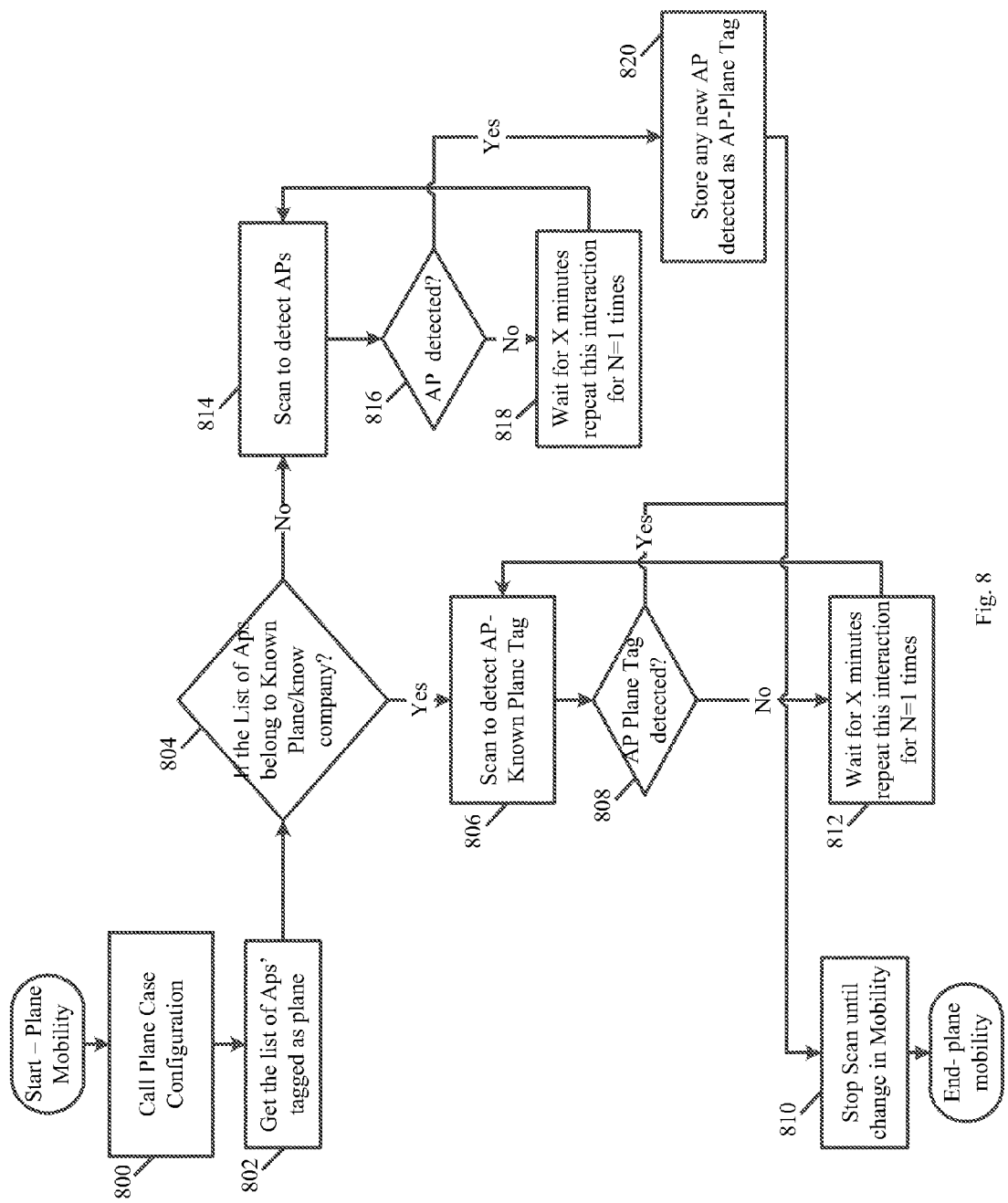
FIG. 8 is a schematic flow chart illustration of a method of determining a scan pattern in an airplane state, in accordance with some demonstrative embodiments.

Reference now is made to FIG. 8, which schematically illustrates a method of determining a scan pattern corresponding to a plane state, in accordance with some demonstrative embodiments. For example, one or more operations of the method of FIG. 8 may be performed by a system, e.g., system 100 (FIG. 1), a mobile device, e.g., mobile device 120 (FIG. 1), an AP, e.g., AP 104 (FIG. 1), a scan controller, e.g., scan controller 128 (FIG. 1), and/or a radio, e.g., radio 124 (FIG. 1).

In some demonstrative embodiments, one or more operations of the method of FIG. 8 may be performed as a part of a method controlling wireless scanning, e.g., as described above with reference to block 220 (FIG. 2).

As indicated at block 800, the method may include determining a plane state of the mobile device. For example, scan controller 128 (FIG. 1) may determine the plane state of mobile device 120 (FIG. 1), e.g., as described above.

As indicated at block 802, the method may include receiving a list of APs tagged "plane" from an AP database. For example, scan controller 128 (FIG. 1) may receive the list of APs tagged "plane" from AP database 132 (FIG. 1), e.g., as described above.

As indicated at block 804, the method may include determining whether the list of APs belongs to a known plane and/or to a known airline company. For example, scan controller 128 (FIG. 1) may determine whether the list of APs belongs to the known plane and/or to the known airline company, e.g., as described above.

As indicated at block 806, the method may include initiating a wireless scanning for the AP tagged "plane" corresponding to the known plane, for example, if the list of APs matching the known plane and/or the known airline company is detected. For example, scan controller 128 (FIG. 1) may initiate the wireless scanning for AP 104 (FIG. 1) tagged "plane" corresponding to the known plane, for example, if scan controller 128 (FIG. 1) detects the list of APs belonging to the known plane and/or to the known airline company, e.g., as described above.

As indicated at block 808, the method may include determining whether the AP tagged "plane" is detected. For example, scan controller 128 (FIG. 1) may determine whether scan controller 128 (FIG. 1) detects AP 104 (FIG. 1) tagged "plane", e.g., as described above.

As indicated at block 810, the method may include stopping the wireless scanning until a change in the mobility state of the mobile device is determined, for example, if the AP tagged "plane" is detected. For example, scan controller 128 (FIG. 1) may stop the wireless scanning until scan controller 128 (FIG. 1) determines the change in the mobility state of mobile device 120 (FIG. 1), for example, if scan controller 128 (FIG. 1) detects AP 104 tagged "plane", e.g., as described above.

As indicated at block 812, the method may include waiting a predefined number, denoted X, of minutes to repeat the wireless scanning for one or more times, for example, if no AP tagged "plane" is detected. For example, scan controller 128 (FIG. 1) may wait X minutes to repeat the wireless scanning for one or more times, for example, if scan controller 128 (FIG. 1) detects no AP 104 (FIG. 1) tagged "plane".

As indicated at block 814, the method may include initiating the wireless scanning to detect one or more APs, for example, if the list of APs does not belong to the known plane and/or to the known airline company. For example, scan controller 128 (FIG. 1) may initiate the wireless scanning to detect one or more APs, for example, if the list of APs does not belong to the known plane and/or to the known airline company, e.g., as described above.

As indicated at block 816, the method may include determining whether the AP is detected, for example, in case of an unknown plane and/or an unknown airline company. For example, scan controller 128 (FIG. 1) may determine whether scan controller 128 (FIG. 1) detects AP 104 (FIG. 1), for example, in case of the unknown plane and/or the unknown airline company, e.g., as described above.

As indicated at block 818, the method may include waiting X minutes to repeat the wireless scanning for one or more times, for example, if no AP is detected. For example, scan controller 128 (FIG. 1) may control radio 124 (FIG. 1) to wait X minutes to repeat the wireless scanning for one or more times, for example, if scan controller 128 (FIG. 1) detects no AP 104 (FIG. 1).

As indicated at block 820, the method may include storing a detected AP under a "plane" tag, for example, if the AP is detected. For example, scan controller 128 (FIG. 1) may store AP 104 (FIG. 1) under the "plane" tag, for example, if scan controller 128 (FIG. 1) detects AP 104 (FIG. 1), e.g., as described above.

Figure 9:
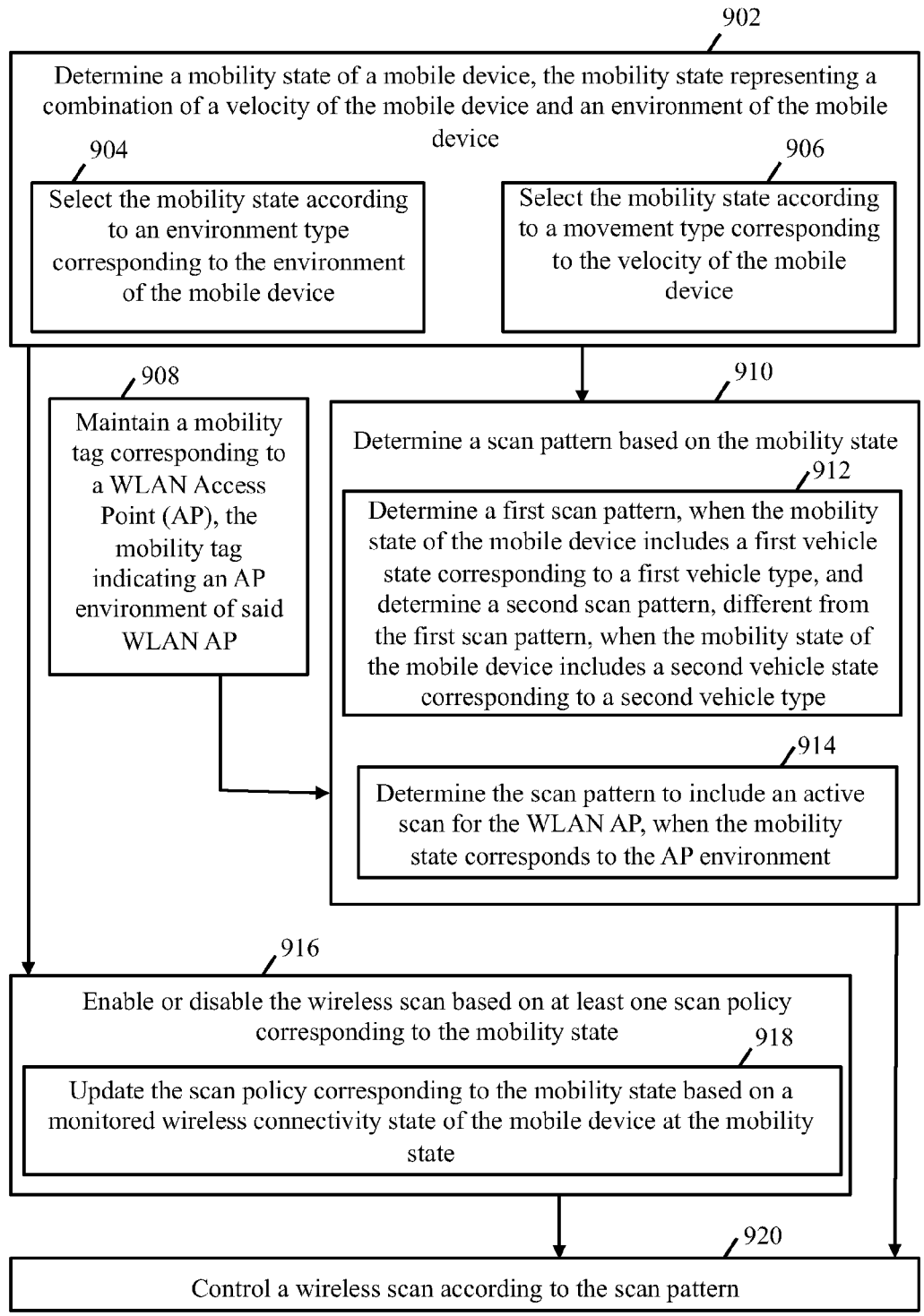
FIG. 9 is a schematic flow chart illustration of a method of controlling wireless scanning, in accordance with some demonstrative embodiments.

Reference now is made to FIG. 9, which schematically illustrates a method of controlling wireless scanning, in accordance with some demonstrative embodiments. For example, one or more operations of the method of FIG. 9 may be performed by a system, e.g., system 100 (FIG. 1), a mobile device, e.g., mobile device 120 (FIG. 1), an AP, e.g., AP 104

(FIG. 1), a scan controller, e.g., scan controller 128 (FIG. 1), and/or a radio, e.g., radio 124 (FIG. 1).

As indicated at block 902, the method may include determining a mobility state of the mobile device, the mobility state representing a combination of a velocity of the mobile device and an environment of the mobile device. For example, scan controller 128 (FIG. 1) may determine the mobility state of mobile device 120 (FIG. 1), the mobility state representing the combination of the velocity of mobile device 120 (FIG. 1) and the environment of mobile device 120 (FIG. 1), e.g., as described above.

As indicated at block 904, the method may include selecting the mobility state according to an environment type corresponding to the environment of the mobile device. For example, scan controller 128 (FIG. 1) may select the mobility state according to the environment type corresponding to the environment of mobile device 120 (FIG. 1), e.g., as described above.

As indicated at block 906, the method may include selecting the mobility state of the mobile device according to a movement type corresponding to the velocity of the mobile device. For example, scan controller 128 (FIG. 1) may select the mobility state of mobile device 120 (FIG. 1) according to the movement type corresponding to the velocity of mobile device 120 (FIG. 1), e.g., as described above.

As indicated at block 910, the method may include determining a scan pattern based on the mobility state of the mobile device. For example, scan controller 128 (FIG. 1) may determine scan pattern 135 (FIG. 1) based on the mobility state of mobile device 120 (FIG. 1), e.g., as described above.

As indicated at block 912, the method may include determining a first scan pattern, when the mobility state of the mobile device includes a first vehicle state corresponding to a first vehicle type, and determining a second scan pattern, different from the first scan pattern, when the mobility state of the mobile device includes a second vehicle state corresponding to a second vehicle type. For example, scan controller 128 (FIG. 1) may determine the first scan pattern, when the mobility state of mobile device 120 (FIG. 1) includes the first vehicle state corresponding to the first vehicle type, and may determine the second scan pattern, different from the first scan pattern, when the mobility state of mobile device 120 (FIG. 1) includes the second vehicle state corresponding to the second vehicle type, e.g., as described above.

As indicated at block 908, the method may include maintaining a mobility tag corresponding to the AP, the mobility tag indicating an AP environment of the AP. For example, scan controller 128 (FIG. 1) may maintain the mobility tag corresponding to AP 104 (FIG. 1), the mobility tag indicating the AP environment of AP 104 (FIG. 1), e.g., as described above.

As indicated at block 914, the method may include determining the scan pattern to include an active scan for the AP, when the mobility state of the mobile device corresponds to the AP environment. For example, scan controller 128 (FIG. 1) may determine scan pattern 135 (FIG. 1) to include the active scan for AP 104 (FIG. 1), when the mobility state of mobile device 120 (FIG. 1) corresponds to the environment of AP 104 (FIG. 1), e.g., as described above.

As indicated at block 916, the method may include enabling or disabling the wireless scanning based on at least one scan policy corresponding to the mobility state of the mobile device. For example, scan controller 128 (FIG. 1) may enable or disable the wireless scanning based on at least one scan policy corresponding to the mobility state of mobile device 120 (FIG. 1), e.g., as described above.

As indicated at block 918, the method may include updating the scan policy corresponding to the mobility state of the mobile device based on a monitored wireless connectivity state of the mobile device at the mobility state. For example, scan controller 128 (FIG. 1) may update the scan policy corresponding to the mobility state of mobile device 120 (FIG. 1) based on the monitored wireless connectivity state of mobile device 120 (FIG. 1) at the mobility state, e.g., as described above.

As indicated at block 920, the method may include controlling the wireless scanning according to the scan pattern. For example, scan controller 128 (FIG. 1) may control the wireless scanning according to scan pattern 135 (FIG. 1), e.g., as described above.

Figure 10:
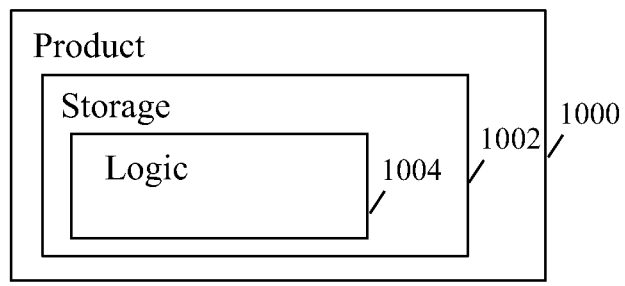
FIG. 10 is a schematic illustration of a product of manufacture, in accordance with some demonstrative embodiments.

Reference now is made to FIG. 10, which schematically illustrates a product of manufacture 1000, in accordance with some demonstrative embodiments. Product 1000 may include one or more tangible computer-readable non-transitory storage media 1002 to store logic 1004, which may be used, for example, to control and/or to perform at least part of the functionality of mobile device 120 (FIG. 1), scan controller 128 (FIG. 1), radio 124 (FIG. 1), receiver 116 (FIG. 1), transmitter 118 (FIG. 1), and/or to perform one or more operations of the method of FIGS. 2, 3, 4, 5, 6, 7, 8, and/or 9. The phrase "non-transitory machine-readable medium" is directed to include all computer-readable media, with the sole exception being a transitory propagating signal.

In some demonstrative embodiments, product 1000 and/or media 1002 may include one or more types of computer-readable storage media capable of storing data, including volatile memory, non-volatile memory, removable or non-removable memory, erasable or non-erasable memory, writeable or re-writeable memory, and the like. For example, machine-readable storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a mobile device comprising a radio to communicate with a wireless network; and a scan controller to control a wireless scan by the radio according to a scan pattern, the scan controller to determine a mobility state of the mobile device, the mobility state representing a combination of a velocity of the mobile device and an environment of the mobile device, and to determine the scan pattern based on the mobility state.

Example 2 includes the subject matter of Example 1, and optionally, wherein the scan controller is to select the mobility state from a plurality of predefined mobility states.

Example 3 includes the subject matter of Example 2, and optionally, wherein the plurality of mobility states corresponds to a plurality of predefined environment types, the scan controller is to select the mobility state according to an environment type corresponding to the environment of the mobile device.

Example 4 includes the subject matter of Example 3, and optionally, wherein the plurality of environment types comprise at least one environment type selected from the group consisting of a home environment, a work environment, a mall environment, a street environment, a building environment, an office environment, and a vehicle environment.

Example 5 includes the subject matter of any one of Examples 2-4, and optionally, wherein the plurality of mobility states includes one or more vehicle states corresponding to one or more types of vehicles.

Example 6 includes the subject matter of Example 5, and optionally, wherein the one or more vehicle states comprise at least one vehicle state selected from the group consisting of a car state, a train state, and an airplane state.

Example 7 includes the subject matter of Example 5 or 6, and optionally, wherein the scan controller is to determine a first scan pattern, when the mobility state of the mobile device includes a first vehicle state corresponding to a first vehicle type, and to determine a second scan pattern, different from the first scan pattern, when the mobility state of the mobile device includes a second vehicle state corresponding to a second vehicle type.

Example 8 includes the subject matter of any one of Examples 2-7, and optionally, wherein the plurality of mobility states corresponds to a plurality of predefined movement states, the scan controller is to select the mobility state according to a movement state corresponding to the velocity of the mobile device.

Example 9 includes the subject matter of Example 8, and optionally, wherein the plurality of movement states includes a static state and at least one non-static state.

Example 10 includes the subject matter of any one of Examples 1-9, and optionally, wherein the scan controller is to enable or disable the wireless scan based on at least one scan policy corresponding to the mobility state.

Example 11 includes the subject matter of Example 10, and optionally, wherein the scan controller is to update the scan policy corresponding to the mobility state based on a monitored wireless connectivity state of the mobile device at the mobility state.

Example 12 includes the subject matter of any one of Examples 1-11, and optionally, wherein the scan controller is to maintain a mobility tag corresponding to an Access Point (AP), the mobility tag indicating an AP environment of the AP, and wherein the scan controller is to determine the scan pattern to include an active scan for the AP, when the mobility state corresponds to the AP environment.

Example 13 includes the subject matter of any one of Examples 1-12, and optionally, wherein the scan controller is to determine the scan pattern based on a movement of the mobile device relative to an Access Point (AP).

Example 14 includes the subject matter of Example 13, and optionally, wherein the scan controller is to determine the movement of the mobile device relative to the AP based on at least one change selected from the group consisting of a change in a power level of signals from the AP, and a change in a difference between a location of the mobile device and a location of the AP.

Example 15 includes the subject matter of any one of Examples 1-14, and optionally, wherein the scan controller is to determine the mobility state based on input information including at least one input selected from the group consisting of cellular information corresponding to a cellular network, Wireless Local Area Network (WLAN) information corresponding to a WLAN, location information from one or more location modules, and movement information from one or more movement sensors.

Example 16 includes the subject matter of any one of Examples 1-15, and optionally, wherein the wireless network comprises a Wireless Local Area Network (WLAN), and the wireless scan comprises a WLAN scan.

Example 17 includes the subject matter of any one of Examples 1-16, and optionally, comprising one or more antennas; a processor; and a memory.

Example 18 includes a method performed by a mobile device, the method comprising determining a mobility state of the mobile device, the mobility state representing a combination of a velocity of the mobile device and an environment of the mobile device; determining a scan pattern based on the mobility state; and controlling a wireless scan according to the scan pattern.

Example 19 includes the subject matter of Example 18, and optionally, comprising selecting the mobility state from a plurality of predefined mobility states.

Example 20 includes the subject matter of Example 19, and optionally, wherein the plurality of mobility states corresponds to a plurality of predefined environment types, the method comprising selecting the mobility state according to an environment type corresponding to the environment of the mobile device.

Example 21 includes the subject matter of Example 20, and optionally, wherein the plurality of environment types comprise at least one environment type selected from the group consisting of a home environment, a work environment, a mall environment, a street environment, a building environment, an office environment, and a vehicle environment.

Example 22 includes the subject matter of any one of Examples 19-21, and optionally, wherein the plurality of mobility states includes one or more vehicle states corresponding to one or more types of vehicles.

Example 23 includes the subject matter of Example 22, and optionally, wherein the one or more vehicle states comprise at least one vehicle state selected from the group consisting of a car state, a train state, and an airplane state.

Example 24 includes the subject matter of Example 22 or 23, and optionally, comprising determining a first scan pattern, when the mobility state of the mobile device includes a first vehicle state corresponding to a first vehicle type, and determining a second scan pattern, different from the first scan pattern, when the mobility state of the mobile device includes a second vehicle state corresponding to a second vehicle type.

Example 25 includes the subject matter of any one of Examples 19-24, and optionally, wherein the plurality of mobility states corresponds to a plurality of predefined movement states, the method comprising selecting the mobility state according to a movement state corresponding to the velocity of the mobile device.

Example 26 includes the subject matter of Example 25, and optionally, wherein the plurality of movement states includes a static state and at least one non-static state.

Example 27 includes the subject matter of any one of Examples 18-26, and optionally, comprising enabling or disabling the wireless scan based on at least one scan policy corresponding to the mobility state.

Example 28 includes the subject matter of Example 27, and optionally, comprising updating the scan policy corresponding to the mobility state based on a monitored wireless connectivity state of the mobile device at the mobility state.

Example 29 includes the subject matter of any one of Examples 18-27, and optionally, comprising maintaining a mobility tag corresponding to an Access Point (AP), the mobility tag indicating an AP environment of the AP, and determining the scan pattern to include an active scan for the AP, when the mobility state corresponds to the AP environment.

Example 30 includes the subject matter of any one of Examples 18-29, and optionally, comprising determining the scan pattern based on a movement of the mobile device relative to an Access Point (AP).

Example 31 includes the subject matter of Example 30, and optionally, comprising determining the movement of the mobile device relative to the AP based on at least one change selected from the group consisting of a change in a power level of signals from the AP, and a change in a difference between a location of the mobile device and a location of the AP.

Example 32 includes the subject matter of any one of Examples 18-31, and optionally, comprising determining the mobility state based on input information including at least one input selected from the group consisting of cellular information corresponding to a cellular network, Wireless Local Area Network (WLAN) information corresponding to a WLAN, location information from one or more location modules, and movement information from one or more movement sensors.

Example 33 includes the subject matter of any one of Examples 18-32, and optionally, wherein the wireless network comprises a Wireless Local Area Network (WLAN), and the wireless scan comprises a WLAN scan.

Example 34 includes a product including one or more tangible computer-readable non-transitory storage media comprising computer-executable instructions operable to, when executed by at least one computer processor, enable the at least one computer processor to implement a method at a mobile device, the method comprising determining a mobility state of the mobile device, the mobility state representing a combination of a velocity of the mobile device and an environment of the mobile device; determining a scan pattern based on the mobility state; and controlling a wireless scan according to the scan pattern.

Example 35 includes the subject matter of Example 34, and optionally, wherein the method comprises selecting the mobility state from a plurality of predefined mobility states.

Example 36 includes the subject matter of Example 35, and optionally, wherein the plurality of mobility states corresponds to a plurality of predefined environment types, the method comprises selecting the mobility state according to an environment type corresponding to the environment of the mobile device.

Example 37 includes the subject matter of Example 36, and optionally, wherein the plurality of environment types comprise at least one environment type selected from the group consisting of a home environment, a work environment, a mall environment, a street environment, a building environment, an office environment, and a vehicle environment.

Example 38 includes the subject matter of any one of Examples 35-37, and optionally, wherein the plurality of mobility states includes one or more vehicle states corresponding to one or more types of vehicles.

Example 39 includes the subject matter of Example 38, and optionally, wherein the one or more vehicle states comprise at least one vehicle state selected from the group consisting of a car state, a train state, and an airplane state.

Example 40 includes the subject matter of Example 38 or 39, and optionally, wherein the method comprises determining a first scan pattern, when the mobility state of the mobile device includes a first vehicle state corresponding to a first vehicle type, and determining a second scan pattern, different from the first scan pattern, when the mobility state of the mobile device includes a second vehicle state corresponding to a second vehicle type.

Example 41 includes the subject matter of any one of Examples 35-40, and optionally, wherein the plurality of mobility states corresponds to a plurality of predefined movement states, the method comprises selecting the mobility state according to a movement state corresponding to the velocity of the mobile device.

Example 42 includes the subject matter of Example 41, and optionally, wherein the plurality of movement states includes a static state and at least one non-static state.

Example 43 includes the subject matter of any one of Examples 34-42, and optionally, wherein the method comprises enabling or disabling the wireless scan based on at least one scan policy corresponding to the mobility state.

Example 44 includes the subject matter of Example 43, and optionally, wherein the method comprises updating the scan policy corresponding to the mobility state based on a monitored wireless connectivity state of the mobile device at the mobility state.

Example 45 includes the subject matter of any one of Examples 34-44, and optionally, wherein the method comprises maintaining a mobility tag corresponding to an Access Point (AP), the mobility tag indicating an AP environment of the AP, and determining the scan pattern to include an active scan for the AP, when the mobility state corresponds to the AP environment.

Example 46 includes the subject matter of any one of Examples 34-45, and optionally, wherein the method comprises determining the scan pattern based on a movement of the mobile device relative to an Access Point (AP).

Example 47 includes the subject matter of Example 46, and optionally, wherein the method comprises determining the movement of the mobile device relative to the AP based on at least one change selected from the group consisting of a change in a power level of signals from the AP, and a change in a difference between a location of the mobile device and a location of the AP.

Example 48 includes the subject matter of any one of Examples 34-47, and optionally, wherein the method comprises determining the mobility state based on input information including at least one input selected from the group consisting of cellular information corresponding to a cellular network, Wireless Local Area Network (WLAN) information corresponding to a WLAN, location information from one or more location modules, and movement information from one or more movement sensors.

Example 49 includes the subject matter of any one of Examples 34-48, and optionally, wherein the wireless network comprises a Wireless Local Area Network (WLAN), and the wireless scan comprises a WLAN scan.

Example 50 includes an apparatus comprising means for determining a mobility state of a mobile device, the mobility state representing a combination of a velocity of the mobile device and an environment of the mobile device; means for determining a scan pattern based on the mobility state; and means for controlling a wireless scan according to the scan pattern.

Example 51 includes the subject matter of Example 50, and optionally, comprising means for selecting the mobility state from a plurality of predefined mobility states.

Example 52 includes the subject matter of Example 51, and optionally, wherein the plurality of mobility states corresponds to a plurality of predefined environment types, the apparatus comprising means for selecting the mobility state according to an environment type corresponding to the environment of the mobile device.

Example 53 includes the subject matter of Example 52, and optionally, wherein the plurality of environment types comprise at least one environment type selected from the group consisting of a home environment, a work environment, a mall environment, a street environment, a building environment, an office environment, and a vehicle environment.

Example 54 includes the subject matter of any one of Examples 51-53, and optionally, wherein the plurality of mobility states includes one or more vehicle states corresponding to one or more types of vehicles.

Example 55 includes the subject matter of Example 54, and optionally, wherein the one or more vehicle states comprise at least one vehicle state selected from the group consisting of a car state, a train state, and an airplane state.

Example 56 includes the subject matter of Example 54 or 55, and optionally, comprising means for determining a first scan pattern, when the mobility state of the mobile device includes a first vehicle state corresponding to a first vehicle type, and determining a second scan pattern, different from the first scan pattern, when the mobility state of the mobile device includes a second vehicle state corresponding to a second vehicle type.

Example 57 includes the subject matter of any one of Examples 51-56, and optionally, wherein the plurality of mobility states corresponds to a plurality of predefined movement states, the apparatus comprising means for selecting the mobility state according to a movement state corresponding to the velocity of the mobile device.

Example 58 includes the subject matter of Example 57, and optionally, wherein the plurality of movement states includes a static state and at least one non-static state.

Example 59 includes the subject matter of any one of Examples 50-58, and optionally, comprising means for enabling or disabling the wireless scan based on at least one scan policy corresponding to the mobility state.

Example 60 includes the subject matter of Example 59, and optionally, comprising means for updating the scan policy corresponding to the mobility state based on a monitored wireless connectivity state of the mobile device at the mobility state.

Example 61 includes the subject matter of any one of Examples 50-59, and optionally, comprising means for maintaining a mobility tag corresponding to an Access Point (AP), the mobility tag indicating an AP environment of the AP, and determining the scan pattern to include an active scan for the AP, when the mobility state corresponds to the AP environment.

Example 62 includes the subject matter of any one of Examples 50-61, and optionally, comprising means for determining the scan pattern based on a movement of the mobile device relative to an Access Point (AP).

Example 63 includes the subject matter of Example 62, and optionally, comprising means for determining the movement of the mobile device relative to the AP based on at least one change selected from the group consisting of a change in a power level of signals from the AP, and a change in a difference between a location of the mobile device and a location of the AP.

Example 64 includes the subject matter of any one of Examples 50-63, and optionally, comprising means for determining the mobility state based on input information including at least one input selected from the group consisting of cellular information corresponding to a cellular network, Wireless Local Area Network (WLAN) information corresponding to a WLAN, location information from one or more location modules, and movement information from one or more movement sensors.

Example 65 includes the subject matter of any one of Examples 50-64, and optionally, wherein the wireless network comprises a Wireless Local Area Network (WLAN), and the wireless scan comprises a WLAN scan.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:
1. A mobile device comprising:
 a radio to communicate with a Wireless Local Area Network (WLAN); and
 a scan controller to control a WLAN scan by said radio according to a scan pattern, said scan controller to determine a mobility state of said mobile device, the mobility state representing a combination of a velocity of said mobile device and an environment type corresponding to an environment of said mobile device, and to determine said scan pattern based on said mobility state, said scan controller is to maintain one or more mobility tags corresponding to one or more respective WLAN Access Points (APs), a mobility tag corresponding to a WLAN AP indicating an environment type corresponding to a location of said WLAN AP, said scan controller is to determine said scan pattern based on a comparison between the environment type of the mobile device and the environment type of the WLAN AP, said controller is to determine said scan pattern based on the velocity of the mobile device and a movement speed of the mobile device relative to the WLAN AP.

2. The mobile device of claim 1, wherein said scan controller is to select said mobility state from a plurality of predefined mobility states.

3. The mobile device of claim 2, wherein said plurality of mobility states corresponds to a plurality of predefined environment types, said scan controller is to select said mobility state according to the environment type corresponding to the environment of said mobile device.

4. The mobile device of claim 3, wherein said plurality of environment types comprise at least one environment type selected from the group consisting of a home environment, a work environment, a mall environment, a street environment, a building environment, an office environment, and a vehicle environment.

5. The mobile device of claim 2, wherein said plurality of mobility states includes one or more vehicle states corresponding to one or more types of vehicles.

6. The mobile device of claim 5, wherein said one or more vehicle states comprise at least one vehicle state selected from the group consisting of a car state, a train state, and an airplane state.

7. The mobile device of claim 5, wherein said scan controller is to determine a first scan pattern, when the mobility state of said mobile device includes a first vehicle state corresponding to a first vehicle type, and to determine a second scan pattern, different from the first scan pattern, when the mobility state of said mobile device includes a second vehicle state corresponding to a second vehicle type.

8. The mobile device of claim 2, wherein said plurality of mobility states corresponds to a plurality of predefined movement states, said scan controller is to select said mobility state according to a movement state corresponding to the velocity of said mobile device.

9. The mobile device of claim 8, wherein said plurality of movement states includes a static state and at least one non-static state.

10. The mobile device of claim 1, wherein said scan controller is to enable or disable said wireless scan based on at least one scan policy corresponding to said mobility state.

11. The mobile device of claim 1, wherein said scan controller is to determine said scan pattern to include an active scan for said WLAN AP, when the environment type of the mobile device is the same as the environment type of the WLAN AP.

12. The mobile device of claim 1 comprising:
one or more antennas;
a processor; and
a memory.

13. A method performed by a mobile device, the method comprising:
determining a mobility state of said mobile device, the mobility state representing a combination of a velocity of said mobile device and an environment type corresponding to an environment of said mobile device;
maintaining one or more mobility tags corresponding to one or more respective Wireless Local Area Network (WLAN) Access Points (APs), a mobility tag corresponding to a WLAN AP indicating an environment type corresponding to a location of said WLAN AP;
determining a scan pattern based on said mobility state, wherein determining the scan pattern comprises determining said scan pattern based on a comparison between the environment type of the mobile device and the environment type of the WLAN AP, and based on the velocity of the mobile device and a movement speed of the mobile device relative to the WLAN AP; and
controlling a WLAN scan according to said scan pattern.

14. The method of claim 13 comprising enabling or disabling said WLAN scan based on at least one scan policy corresponding to said mobility state.

15. The method of claim 13 comprising determining said scan pattern to include an active scan for said WLAN AP, when the environment type of the mobile device is the same as the environment type of the WLAN AP.

16. A product including one or more tangible computer-readable non-transitory storage media comprising computer-executable instructions operable to, when executed by at least one computer processor, enable the at least one computer processor to implement operations at a mobile device, the operations comprising:
determining a mobility state of said mobile device, the mobility state representing a combination of a velocity of said mobile device and an environment type corresponding to an environment of said mobile device;
maintaining one or more mobility tags corresponding to one or more respective Wireless Local Area Network (WLAN) Access Points (APs), a mobility tag corresponding to a WLAN AP indicating an environment type corresponding to a location of said WLAN AP;
determining a scan pattern based on said mobility state, wherein determining the scan pattern comprises determining said scan pattern based on a comparison between the environment type of the mobile device and the environment type of the WLAN AP, and based on the velocity of the mobile device and a movement speed of the mobile device relative to the WLAN AP; and
controlling a WLAN scan according to said scan pattern.

17. The product of claim 16, wherein said operations comprise selecting said mobility state from a plurality of predefined mobility states.

18. The product of claim 17, wherein said plurality of mobility states corresponds to a plurality of predefined environment types, said operations comprise selecting said mobility state according to the environment type corresponding to the environment of said mobile device.

19. The product of claim 18, wherein said plurality of environment types comprise at least one environment type selected from the group consisting of a home environment, a work environment, a mall environment, a street environment, a building environment, an office environment, and a vehicle environment.

20. The product of claim 17, wherein said plurality of mobility states includes one or more vehicle states corresponding to one or more types of vehicles.

21. The product of claim 20, wherein said operations comprise determining a first scan pattern, when the mobility state of said mobile device includes a first vehicle state corresponding to a first vehicle type, and determining a second scan pattern, different from the first scan pattern, when the mobility state of said mobile device includes a second vehicle state corresponding to a second vehicle type.

22. The product of claim 17, wherein said plurality of mobility states corresponds to a plurality of predefined movement states, said operations comprise selecting said mobility state according to a movement state corresponding to the velocity of said mobile device.

23. The product of claim 16, wherein said operations comprise determining said scan pattern to include an active scan for said WLAN AP, when the environment type of the mobile device is the same as the environment type of the WLAN AP.

* * * * *